US010508902B2

(12) United States Patent
Tabuchi et al.

(10) Patent No.: US 10,508,902 B2
(45) Date of Patent: Dec. 17, 2019

(54) THREE-DIMENSIONAL MEASUREMENT DEVICE

(71) Applicant: Keyence Corporation, Osaka (JP)

(72) Inventors: Jun Tabuchi, Osaka (JP); Takashi Nakatsukasa, Osaka (JP)

(73) Assignee: Keyence Corporation, Osaka (JP)

( * ) Notice: Subject to any disclaimer, the term of this patent is extended or adjusted under 35 U.S.C. 154(b) by 232 days.

(21) Appl. No.: 15/619,557

(22) Filed: Jun. 12, 2017

(65) Prior Publication Data

US 2018/0058843 A1  Mar. 1, 2018

(30) Foreign Application Priority Data

Aug. 26, 2016  (JP) ................ 2016-166267

(51) Int. Cl.
*G01B 11/25* (2006.01)
*G01B 21/04* (2006.01)

(52) U.S. Cl.
CPC .......... *G01B 11/2513* (2013.01); *G01B 21/04* (2013.01)

(58) Field of Classification Search
CPC ............................. G01B 11/2513; G01B 21/04
See application file for complete search history.

(56) References Cited

U.S. PATENT DOCUMENTS

| 9,053,547 | B2* | 6/2015 | Kitamura | ............... | G01B 11/24 |
| 9,390,202 | B2* | 7/2016 | O'Hare | ................... | G06F 17/50 |
| 2012/0194672 | A1 | 8/2012 | Kawa | | |
| 2012/0194673 | A1 | 8/2012 | Kawa | | |
| 2013/0100170 | A1 | 4/2013 | Matsumura et al. | | |
| 2014/0071243 | A1 | 3/2014 | Nakatsukasa | | |

(Continued)

FOREIGN PATENT DOCUMENTS

JP      2010-137680     *   2/2011

OTHER PUBLICATIONS

Guhring, J., "Dense 3-D surface acquisition by structured light using off-the-shelf components," SPIE vol. 4309, Jan. 22-23, 2001, pp. 220-231.

(Continued)

*Primary Examiner* — Mohamed Charioui
*Assistant Examiner* — Catherine T. Rastovski
(74) *Attorney, Agent, or Firm* — Kilyk & Bowersox, P.L.L.C.

(57) ABSTRACT

A three-dimensional measurement device which is capable of increasing the operability at the time of repeatedly performing dimension measurement for a plurality of measurement target objects having substantially the same shape is provided. There are included a template storage unit for storing, as a template, model three-dimensional shape data and an operation procedure of dimension measurement performed on the model three-dimensional shape image, and a positional relationship specification unit for specifying a relative positional relationship between the model three-dimensional shape data and measurement three-dimensional shape data. The geometric element extraction unit specifies a geometric element of a measurement three-dimensional shape based on the relative positional relationship and the template, and the dimension value calculation unit performs dimension measurement on the measurement three-dimensional shape based on the relative positional relationship and the template.

7 Claims, 34 Drawing Sheets

(56) References Cited

U.S. PATENT DOCUMENTS

| | | |
|---|---|---|
| 2014/0071458 A1 | 3/2014 | Nakatsukasa |
| 2014/0071459 A1 | 3/2014 | Nakatsukasa |
| 2014/0146325 A1 | 5/2014 | Tabuchi |
| 2014/0152794 A1 | 6/2014 | Takahashi |
| 2017/0030706 A1 | 2/2017 | Natori et al. |
| 2017/0032177 A1 | 2/2017 | Suenaga et al. |

OTHER PUBLICATIONS

Bergmann, D., "New approach for automatic surface reconstruction with coded light," SPIE vol. 2572, Jul. 9-10, 1995, pp. 2-9.

* cited by examiner

THREE-DIMENSIONAL MEASUREMENT DEVICE

CROSS-REFERENCE TO RELATED APPLICATIONS

The present application claims foreign priority based on Japanese Patent Application No. 2016-166267, filed Aug. 26, 2016, the contents of which is incorporated herein by reference.

BACKGROUND OF THE INVENTION

1. Field of the Invention

The present invention relates to a three-dimensional measurement device, and more specifically, to an improvement in a three-dimensional measurement device for measuring a three-dimensional shape of a measurement target object.

2. Description of Related Art

A three-dimensional measurement device is a measurement instrument for three-dimensionally measuring the shape or the dimensions of a measurement target object, and is capable of measuring position information of a large number of measurement points in a three-dimensional space by using the principle of triangulation or the like, and of acquiring three-dimensional shape data representing the three-dimensional shape of the measurement target object. For example, stripe-patterned light is projected on a measurement target object placed on a stage, and image of the measurement target object on the stage is captured by a camera in this state. Height information of the measurement target object is determined by analyzing captured images, based on the shift between patterns and the level of distortion.

The three-dimensional shape of the measurement target object is displayed on a screen based on the three-dimensional shape data acquired in the above manner. Dimension measurement is performed by extracting a geometric element by designating a geometric element at a measurement position or the shape of the geometric element, and by determining the distance or the angle between geometric elements.

With a conventional three-dimensional measurement device as described above, in the case of sequentially measuring a plurality of measurement target objects having substantially the same shape and acquiring a plurality of pieces of three-dimensional shape data, and then, performing dimension measurement based on the pieces of three-dimensional shape data, a geometric element at a measurement position, the shape or the dimension type of the geometric element, or the like has to be designated for each measurement target object. Accordingly, the same operation procedure has to be repeated, and there is a problem that the operation is burdensome. Also, if the number of times of measurement is increased, operation errors may occur.

SUMMARY OF THE INVENTION

The present invention has been made in view of the above circumstance, and has its object to provide a three-dimensional measurement device which is capable of increasing the operability at the time of repeatedly performing dimension measurement for a plurality of measurement target objects having substantially the same shape.

According to one embodiment of the invention, a three-dimensional measurement device includes a shape data storage unit for holding model three-dimensional shape data that is used as a model at a time of repeatedly performing dimension measurement for a plurality of measurement target objects having a substantially same shape, a shape data generation unit for measuring position information of a plurality of measurement points in a three-dimensional space, and generating measurement three-dimensional shape data representing a three-dimensional shape of a measurement target object, a three-dimensional shape display unit for displaying a model three-dimensional shape image corresponding to the model three-dimensional shape data and a measurement three-dimensional shape image corresponding to the measurement three-dimensional shape data, a dimension value calculation unit for performing dimension measurement on the model three-dimensional shape image being displayed, and determining a dimension value, a geometric element extraction unit for specifying a first geometric element based on designation of a position from the model three-dimensional shape image being displayed, and specifying a second geometric element based on designation of a position from the measurement three-dimensional shape image being displayed, a template storage unit for storing, as a template, the model three-dimensional shape data and an operation procedure of dimension measurement performed on the model three-dimensional shape image, and a positional relationship specification unit for specifying a relative positional relationship between the model three-dimensional shape data and the measurement three-dimensional shape data based on the first geometric element and the second geometric element. The geometric element extraction unit specifies a geometric element of a measurement three-dimensional shape based on the relative positional relationship and the template, and the dimension value calculation unit performs dimension measurement on the measurement three-dimensional shape based on the relative positional relationship and the template.

According to such a configuration, because model three-dimensional shape data and the operation procedure of dimension measurement performed on the model three-dimensional shape image are stored as a template, the burden of having to designate the geometric element at a measurement position or the dimension type for each measurement target object can be eliminated. Also, because a first geometric element and a second geometric element are specified and the relative positional relationship between model three-dimensional shape data and measurement three-dimensional shape data is specified by designating positions from a model three-dimensional shape image and a measurement three-dimensional shape image being displayed, dimension measurement may be performed by accurately specifying a geometric element at a measurement position from the measurement three-dimensional shape.

According to another embodiment of the invention, in addition to the configuration described above, the three-dimensional measurement device is configured such that the three-dimensional shape display unit displays, based on the relative positional relationship, the model three-dimensional shape image and the measurement three-dimensional shape image in an overlapping manner in such a way that the first geometric element and the second geometric element are coincident with each other, and the dimension value calculation unit starts dimension measurement of the measurement three-dimensional shape based on the template in response to an instruction for start of measurement.

According to such a configuration, because the model three-dimensional shape image and the measurement three-dimensional shape image are displayed in an overlapping manner, whether alignment by the first geometric element and the second geometric element is appropriate or not may be easily checked. Also, dimension measurement of the measurement three-dimensional shape based on the template is started in response to an instruction for start of measurement, and thus, dimension measurement of the measurement three-dimensional shape based on the template may be prevented from being performed when alignment by the first geometric element and the second geometric element is not appropriate.

According to still another embodiment of the invention, in addition to the configuration described above, the three-dimensional measurement device further includes a reference plane designation unit for designating a reference plane from the model three-dimensional shape image, a cutting line designation unit for receiving designation of a cutting line in a display screen, and a profile acquisition unit for acquiring, based on the model three-dimensional shape data, a model cross-sectional profile showing a cross-sectional shape of a model three-dimensional shape that is cut along a cut surface that includes the cutting line and that is perpendicular to the display screen, where the three-dimensional shape display unit rotates the model three-dimensional shape in such a way that a normal line of the reference plane is orthogonal to the display screen or is parallel to a vertical direction or a lateral direction of the display screen, where the profile acquisition unit acquires the model cross-sectional profile by cutting, along the cut surface, the model three-dimensional shape after rotation, and where the dimension value calculation unit performs dimension measurement based on the model cross-sectional profile.

According to such a configuration, because the reference plane is positioned at a specific attitude with respect to the display screen, where and by which cutting line cutting should be performed to obtain a desired cut surface from the model three-dimensional shape which is to be cut along the cutting line can be intuitively grasped. Furthermore, the cutting line is a one-dimensional geometric figure in the display screen, and the cut surface is perpendicular to the display screen, and thus, compared to a case where a two-dimensional cut surface is directly designated in a three-dimensional space, a cut surface may be easily designated. Moreover, because dimension measurement is performed based on a model cross-sectional profile of a desired cut surface, a measurement position, the shape of a measurement element, and the dimension type may be intuitively designated. The one-dimensional geometric figure may be a straight line, a zigzag line, a curved line, or a combination of such lines.

According to still another embodiment of the invention, in addition to the configuration described above, the three-dimensional measurement device is configured such that, if a geometric element is designated after dimension measurement of the measurement three-dimensional shape based on the template, the dimension value calculation unit performs dimension measurement of the measurement three-dimensional shape for a corresponding measurement position, and determines a dimension value. According to such a configuration, a measurement position may be newly added to acquire a dimension value or dimension measurement may be performed again for a specific measurement position after dimension measurement is performed on a measurement three-dimensional shape based on the template.

According to the present invention, model three-dimensional shape data and the operation procedure of dimension measurement performed on a model three-dimensional shape image are stored as a template, and a geometric element at a measurement position or the dimension type does not have to be designated for each measurement target object, and thus, the operability at the time of repeatedly performing dimension measurement for a plurality of measurement target objects having substantially the same shape may be increased.

DETAILED DESCRIPTION OF PREFERRED EMBODIMENTS

First Embodiment

First, a schematic configuration of a three-dimensional measurement device according to a first embodiment of the present invention will be described below with reference to FIGS. 1 to 6.

<Three-Dimensional Measurement Device 1>

Figure 1:
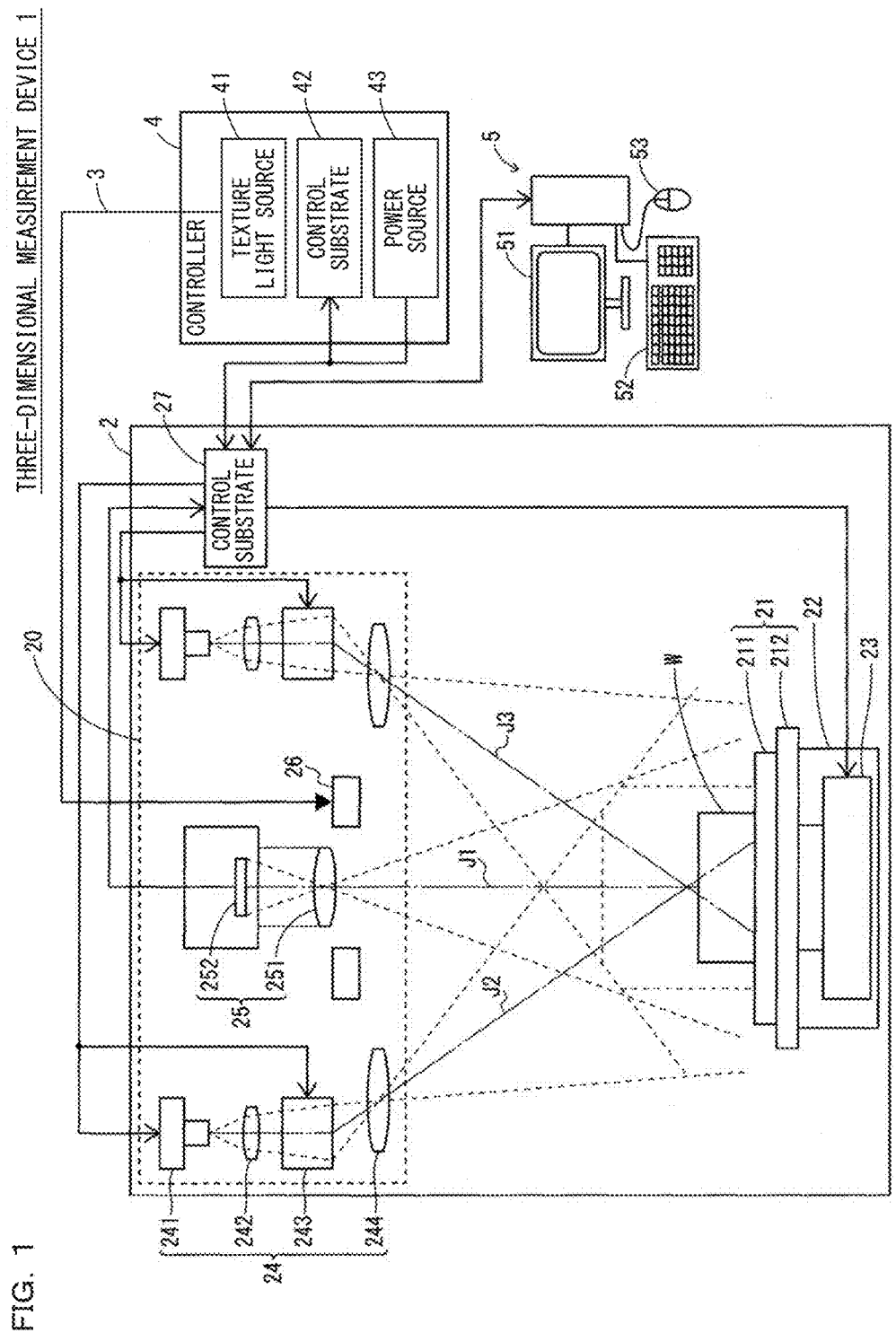
FIG. 1 is a system diagram showing an example configuration of a three-dimensional measurement device according to a first embodiment of the present invention.

FIG. 1 is a system diagram showing an example configuration of a three-dimensional measurement device 1 according to the first embodiment of the present invention. The three-dimensional measurement device 1 is a measurement instrument for optically measuring the shape of a measurement target object W, and is configured from a measurement unit 2, a controller 4, and an information processing terminal 5.

<Measurement Unit 2>

The measurement unit 2 is a measurement unit for radiating measurement light of visible light on a measurement target object W placed on a stage 21, receiving the measurement light reflected by the measurement target object W, and generating a captured image, and is configured from a head unit 20, the stage 21, a stage holding unit 22, a rotation drive unit 23, and a control substrate 27.

The head unit 20 is configured from light projection units 24 for radiating patterned measurement light on the measurement target object W, a light receiving unit 25 for receiving the measurement light reflected by the measurement target object W and generating a received light signal indicating the amount of received light, and texture illumination emitting units 26.

The stage 21 is a work table having a mounting surface where the measurement target object W is to be mounted. The stage 21 is formed from a stage plate 211, which is a circular disc, and a stage base 212 supporting the stage plate 211.

The stage plate 211 can be bent at around the center and be fixed, and can function as a ramp for causing the measurement target object W to normally face the light receiving unit 25. The stage holding unit 22 rotatably holds the stage 21 so as to adjust the imaging angle of the measurement target object W on the stage 21. The rotation drive unit 23 switches the imaging angle by rotating the stage 21.

The light receiving unit 25 is a camera with fixed magnification for capturing an image of the measurement target object W on the stage 21, and is configured from a light receiving lens 251 and an image sensor 252. The image sensor 252 includes a large number of photodetectors that each receive measurement light from the measurement target object W through the light receiving lens 251 and generate a received light signal indicating the amount of received light, and a captured image is generated from the received light signals. As the image sensor 252, an image sensor such as a charge coupled device (CCD) or a complementary metal oxide semiconductor (CMOS) is used. For example, the image sensor 252 is a monochrome image sensor.

The light projection unit 24 is an illumination device for radiating measurement light on the measurement target object W on the stage 21, and is configured from a projection light source 241, a collector lens 242, a pattern generation unit 243, and a light projection lens 244. As the projection light source 241, a light-emitting diode (LED) or a halogen lamp that generates light in one color is used, for example. A single-color projection light source 241 is more advantageous than a white light source in terms of the ease of chromatic aberration correction, for example. Also, a shorter wavelength is advantageous in increasing the resolution in shape measurement, and thus, a blue light source, such as a blue LED, is desirably used as the projection light source 241. However, a wavelength is selected which enables the image sensor 252 to receive light with good SNR.

Additionally, in the case of using the projection light source 241 of a single color, such as blue, if the image sensor 252 is a color image sensor, RG photodetectors cannot be used, and only B photodetectors are used, and thus, the number of usable pixels is reduced. Accordingly, in the case of equalized pixel size or number of pixels, a monochrome image sensor is advantageously used as the image sensor 252.

Light emitted from the projection light source 241 enters the pattern generation unit 243 through the collector lens 242. Then, measurement light emitted from the pattern generation unit 243 is radiated through the light projection lens 244 onto the measurement target object W on the stage 21.

The pattern generation unit 243 is a device for generating patterned light for structured illumination, and is capable of switching between uniform measurement light and measurement light of a two-dimensional pattern. A digital micromirror device (DMD) or a liquid crystal panel is used for the pattern generation unit 243, for example. The DMD is a display element that has a large number of very small mirrors arranged two-dimensionally and that is capable of switching between a bright state and a dark state on a per-pixel basis by controlling the inclination of each mirror.

A structured illumination method for measuring the three-dimensional shape of a measurement target object W by using the principle of triangulation may be a sinusoidal phase-shifting method, a multi-slit method, a spatial coding method, or the like. The sinusoidal phase-shifting method is an illumination method of projecting a sinusoidal stripe pattern on a measurement target object W, and of acquiring a captured image each time the stripe pattern is moved at a pitch less than the sinusoidal cycle. Three-dimensional shape data is obtained by determining the phase value of each pixel from the luminance value of each captured image and transforming the value into height information.

The multi-slit method is an illumination method of projecting a thin stripe pattern on a measurement target object W, and of acquiring a captured image each time the stripe pattern is moved at a pitch less than the gap between the stripes. Three-dimensional shape data is obtained by determining the capturing timing of maximum luminance of each pixel from the luminance value of each captured image and transforming the timing into height information.

The spatial coding method is an illumination method of sequentially projecting, on a measurement target object W, a plurality of stripe patterns with different stripe widths where the duty ratio of black/white is 50%, and of acquiring captured images. Three-dimensional shape data is obtained by determining the code value of each pixel from the luminance value of each captured image and transforming the value into height information.

The pattern generation unit 243 may generate the stripe patterns mentioned above as two-dimensional patterns. According to the three-dimensional measurement device 1, the multi-slit method and the spatial coding method are used in combination so as to acquire high-resolution three-dimensional shape data with high accuracy.

Also, with the three-dimensional measurement device 1, two light projection units 24 are arranged in a left-right symmetrical manner across the light receiving unit 25. Respective light projection axes J2 and J3 of the light projection units 24 are inclined with respect to a light receiving axis J1 of the light receiving unit 25 so as to enable use of the principle of triangulation. With the light projection units 24, the light projection axes J2 and J3 are inclined by offsetting the light projection lenses 244 toward the light receiving axis J1 with respect to optical axes of the projection light sources 241, the collector lenses 242, and the pattern generation units 243. By adopting such a configuration, the measurement unit 2 may be downsized compared to a case of causing the entire light projection units 24 to be inclined.

The texture illumination emitting units 26 emit, toward the measurement target object W on the stage 21, uniform illumination light of visible light for detecting the color or the pattern of the measurement target object W as surface texture information. The texture illumination emitting units 26 are arranged to surround the light receiving lens 251 of the light receiving unit 25, and the light projection axes of the texture illumination emitting units 26 are substantially parallel to the light receiving axis J1 of the light receiving unit 25. Accordingly, in contrast to illumination from the light projection units 24, a shadow is less likely to be formed on the measurement target object W, and the dead angle at the time of capturing is made small.

The control substrate 27 is a circuit board provided with a control circuit for controlling the rotation drive unit 23, a drive circuit for driving the projection light source 241 and the pattern generation unit 243 of the light projection unit 24, a processing circuit for processing a received light signal from the image sensor 252 of the light receiving unit 25, and the like.

<Controller 4>

The controller 4 is a control device for the measurement unit 2, and is configured from a texture light source 41 for generating illumination light for texture illumination, a control substrate 42 provided with a drive circuit for the texture light source 41 and the like, and a power source 43 for supplying power to each device inside the measurement unit 2. The texture light source 41 sequentially illuminates respective illumination light of colors, red (R), green (G), and blue (B), for example, so as to obtain a color texture image from a captured image. Since the image sensor 252 is a monochrome image sensor, in the case of acquiring texture information by using white light source for the texture light source 41, color information cannot be acquired. Accordingly, the texture light source 41 performs illumination by switching among RGB.

Additionally, in a case where a monochrome texture image suffices, a white light source, such as a white LED, or a light source that simultaneously emits single-color light in RGB may be used for the texture light source 41. Moreover, in the case where reduction in measurement accuracy is allowed to a certain extent, a color image sensor may be used for the image sensor 252. Illumination light is transmitted through a light guide 3 to each texture illumination emitting unit 26 of the measurement unit 2. The control substrate 42 and the power source 43 are connected to the control substrate 27 of the measurement unit 2.

<Information Processing Terminal 5>

The information processing terminal 5 is a terminal device for controlling the measurement unit 2, and performing screen display of a captured image, registration of setting information for dimension measurement, generation of three-dimensional shape data, dimension calculation of a measurement target object W and the like, and is connected to a display unit 51, a keyboard 52, and a mouse 53. The display unit 51 is a monitor device for displaying a captured image and setting information on a screen. The keyboard 52 and the mouse 53 are input devices used by a user to perform operation input. The information processing terminal is a personal computer, for example, and is connected to the control substrate 27 of the measurement unit 2.

Figure 2:
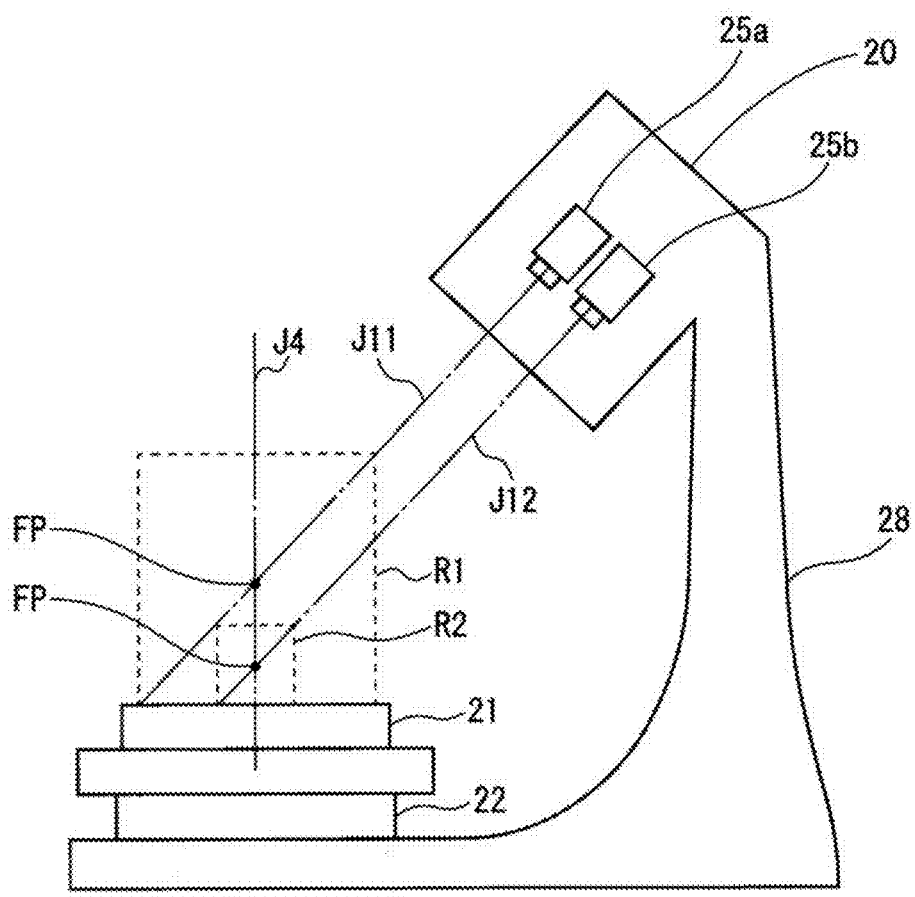
FIG. 2 is an explanatory diagram schematically showing an example configuration of a measurement unit in FIG. 1.

FIG. 2 is an explanatory diagram schematically showing an example configuration of the measurement unit 2 in FIG. 1. The measurement unit 2 is configured from the head unit 20 including two imaging units 25a and 25b with different capturing magnifications, the stage holding unit 22 holding the stage 21 in a manner allowing rotation around a rotation axis J4 in the vertical direction, and a coupling unit 28 for coupling the head unit 20 and the stage holding unit 22.

The coupling unit 28 fixedly couples the head unit 20 and the stage holding unit 22 in a state where the light projection axes J2 and J3 of the light projection units 24 and light receiving axes J11 and J12 of the imaging units 25a and 25b are inclined with respect to the rotation axis J4. Accordingly, the relative positional relationship between the stage 21 and the imaging units 25a, 25b is constant, and pieces of point cloud data may be easily coupled and synthesized for a plurality of imaging angles at different rotation angles with respect to the stage 21.

The imaging unit 25a is a light receiving unit 25 with low magnification. The imaging unit 25b is a light receiving unit 25 with magnification higher than that of the imaging unit 25a. The imaging units 25a and 25b are arranged with the light receiving axes J11 and J12 inclined with respect to the rotation axis J4 of the stage 21 so that three-dimensional shape data of the entire measurement target object may be obtained.

For example, inclination angles of the light receiving axes J11 and J12 with respect to the rotation axis J4 are about 45 degrees. Moreover, the imaging unit 25b is arranged below the imaging unit 25a so that a focal position FP of the imaging unit 25b is below a focal position FP of the imaging unit 25a on the rotation axis J4 of the stage 21, and the light receiving axis J12 is substantially parallel to the light receiving axis J11.

By adopting such a configuration, a measurable range R1 of the imaging unit 25a and a measurable range R2 of the imaging unit 25b may be appropriately formed on the stage 21. The measurable ranges R1 and R2 are columnar regions centering on the rotation axis J4 of the stage 21, and the measurable range R2 is formed within the measurable range R1.

Figure 3:
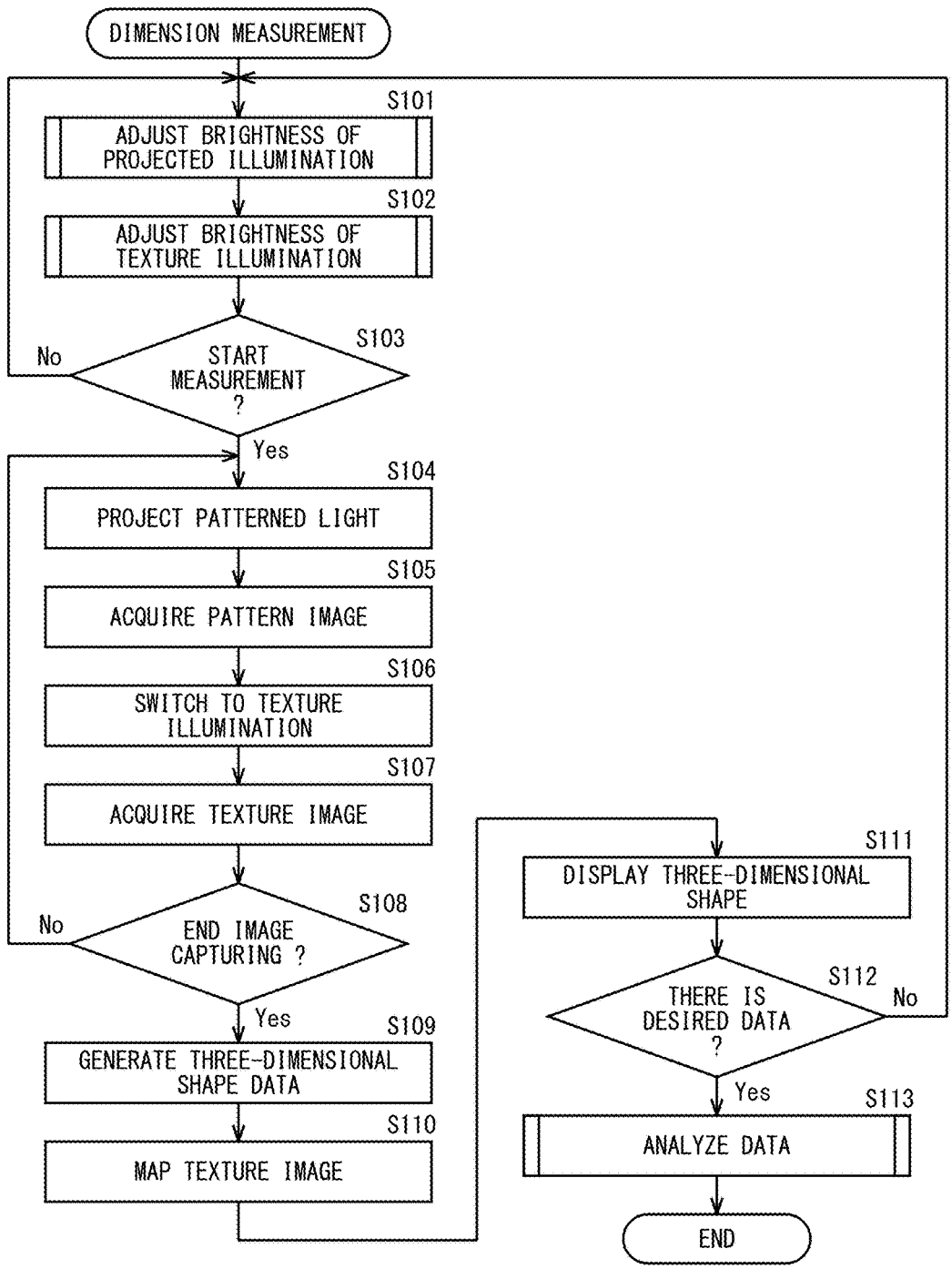
FIG. 3 is a flowchart showing an example of operation at the time of dimension measurement by the three-dimensional measurement device.

FIG. 3 is a flowchart showing, in steps S101 to S113, an example of operation at the time of dimension measurement by the three-dimensional measurement device 1. First, the three-dimensional measurement device 1 captures an image of a measurement target object W placed on the stage 21 by the light receiving unit 25, displays the captured image by the display unit 51, and adjusts the brightness of projected illumination (step S101). The brightness adjustment is performed by radiating, from the light projection units 24, uniform measurement light or measurement light which is patterned light.

Next, the three-dimensional measurement device 1 switches to texture illumination, acquires a captured image and displays the image by the display unit 51, and adjusts brightness of the texture illumination (step S102). The brightness adjustment is performed by sequentially or simultaneously radiating, from the texture illumination emitting units 26, illumination light of colors, red (R), green (G), and blue (B). The order of steps S101 and S102 may be reversed.

The three-dimensional measurement device 1 repeats the procedure in steps S101 and S102 until illumination conditions are established, and after the illumination conditions are established, if a user indicates that measurement is to be started (step S103), patterned light is projected by the light projection units 24 (step S104), and a pattern image is acquired (step S105). The pattern image is a captured image obtained by capturing an image of the measurement target object W on the stage 21. Projection of patterned light and acquisition of a captured image are performed while synchronizing the pattern generation unit 243 and the light receiving unit 25.

Next, the three-dimensional measurement device 1 switches to texture illumination, and acquires a texture image (steps S106, S107). The texture image is obtained by compositing a plurality of captured images acquired by sequentially radiating illumination light of respective colors, red (R), green (G), and blue (B). At the time of continuous measurement, procedure from steps S104 to S107 is repeated while sequentially switching the stage 21 to a plurality of imaging angles designated in advance (step S108).

Next, the three-dimensional measurement device 1 analyzes the pattern image acquired in step S105 by a predetermined measurement algorithm, and generates three-dimensional shape data (step S109). In the step of generating the three-dimensional shape data, pieces of three-dimensional shape data obtained from a plurality of captured images with different imaging angles are synthesized as necessary. Then, the three-dimensional measurement device 1 maps the texture image on the generated three-dimensional shape data (step S110), and displays the result by the display unit 51 as the three-dimensional shape of the measurement target object W (step S111).

The three-dimensional measurement device 1 repeats the procedure from steps S101 to S111 for a desired measurement position until the three-dimensional shape data is obtained, while changing the imaging angles, the capturing conditions, or the like (step S112), and when desired data is obtained and an instruction for data analysis is issued by the user, the three-dimensional measurement device 1 performs data analysis of the three-dimensional shape data by an application program for dimension measurement, and calculates the dimensions of the measurement target object W (step S113).

Figure 4:
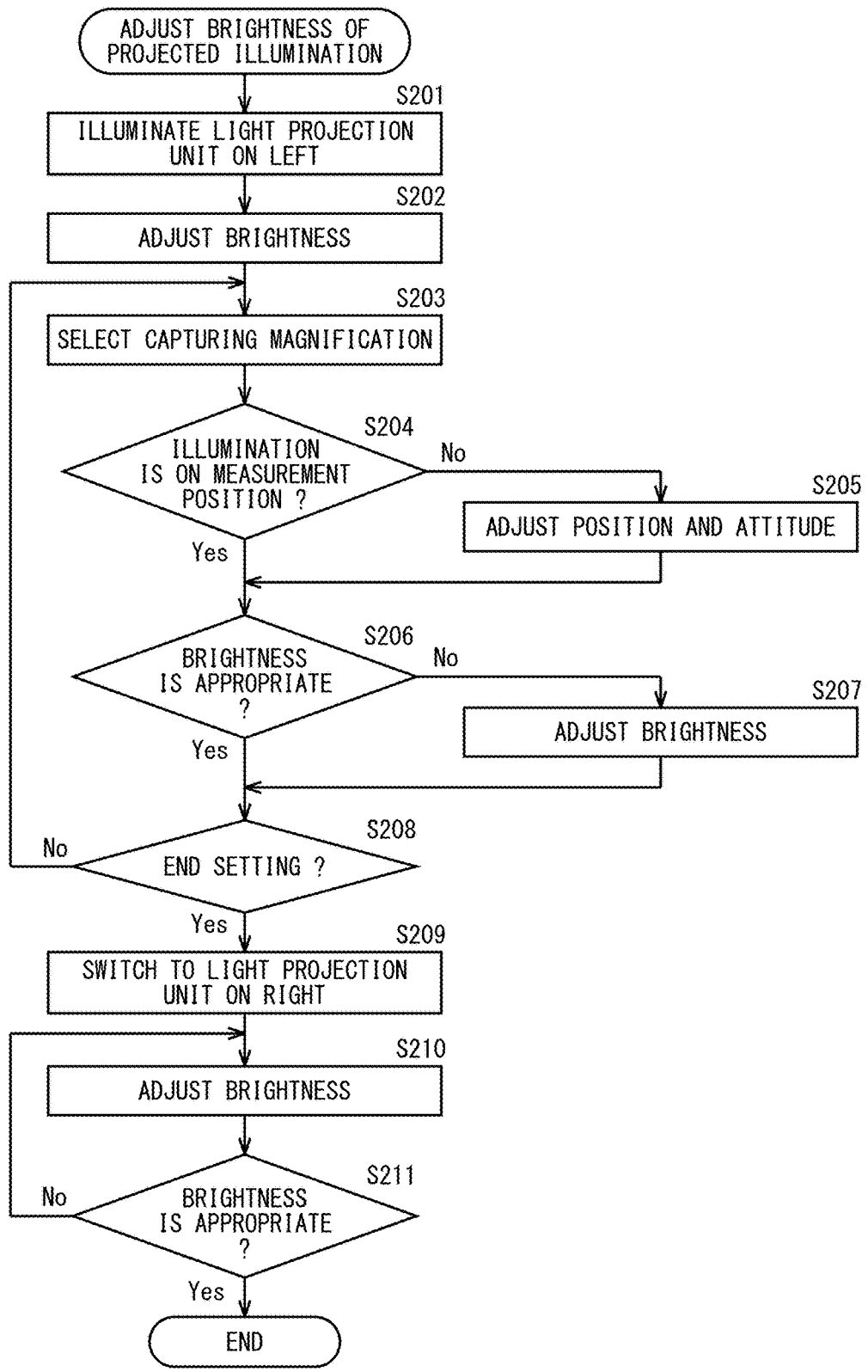
FIG. 4 is a flowchart showing an example of detailed operation of step S101 (adjustment of brightness of projected illumination) in FIG. 3.

FIG. 4 is a flowchart showing, in steps S201 to S211, an example of detailed operation of step S101 (adjustment of brightness of projected illumination) in FIG. 3, and shows an operation of the three-dimensional measurement device 1. First, the three-dimensional measurement device 1 illuminates the light projection unit 24 on the left (step S201), and receives adjustment of brightness by the user (step S202).

Next, the three-dimensional measurement device 1 receives selection of capturing magnification by the user, and when the capturing magnification is changed, the three-dimensional measurement device 1 switches to the corresponding imaging unit 25a or 25b (step S203). At this time, if illumination is not on the desired measurement position, the three-dimensional measurement device 1 rotates the stage 21 based on a user operation, and adjusts the position and the attitude of the measurement target object W (steps S204, S205). Adjustment of the position and the attitude may be performed while illuminating the light projection units 24 on the left and the right at the same time.

Then, if the brightness at the measurement position is not appropriate, the three-dimensional measurement device 1 again receives adjustment of brightness by the user (steps S206, S207). The three-dimensional measurement device 1 repeats the procedure from steps S203 to S207 until the user indicates end of setting (step S208).

Next, when end of setting is indicated by the user, the three-dimensional measurement device 1 registers illumination conditions designated by the user as setting information, and switches to the light projection unit 24 on the right (step S209), and receives adjustment of brightness by the user (step S210). The three-dimensional measurement device 1 repeats the procedure in step S210 until end of setting is indicated by the user, and when end of setting is indicated by the user, illumination conditions designated by the user are registered as setting information, and the process is ended (step S211).

Figure 5:
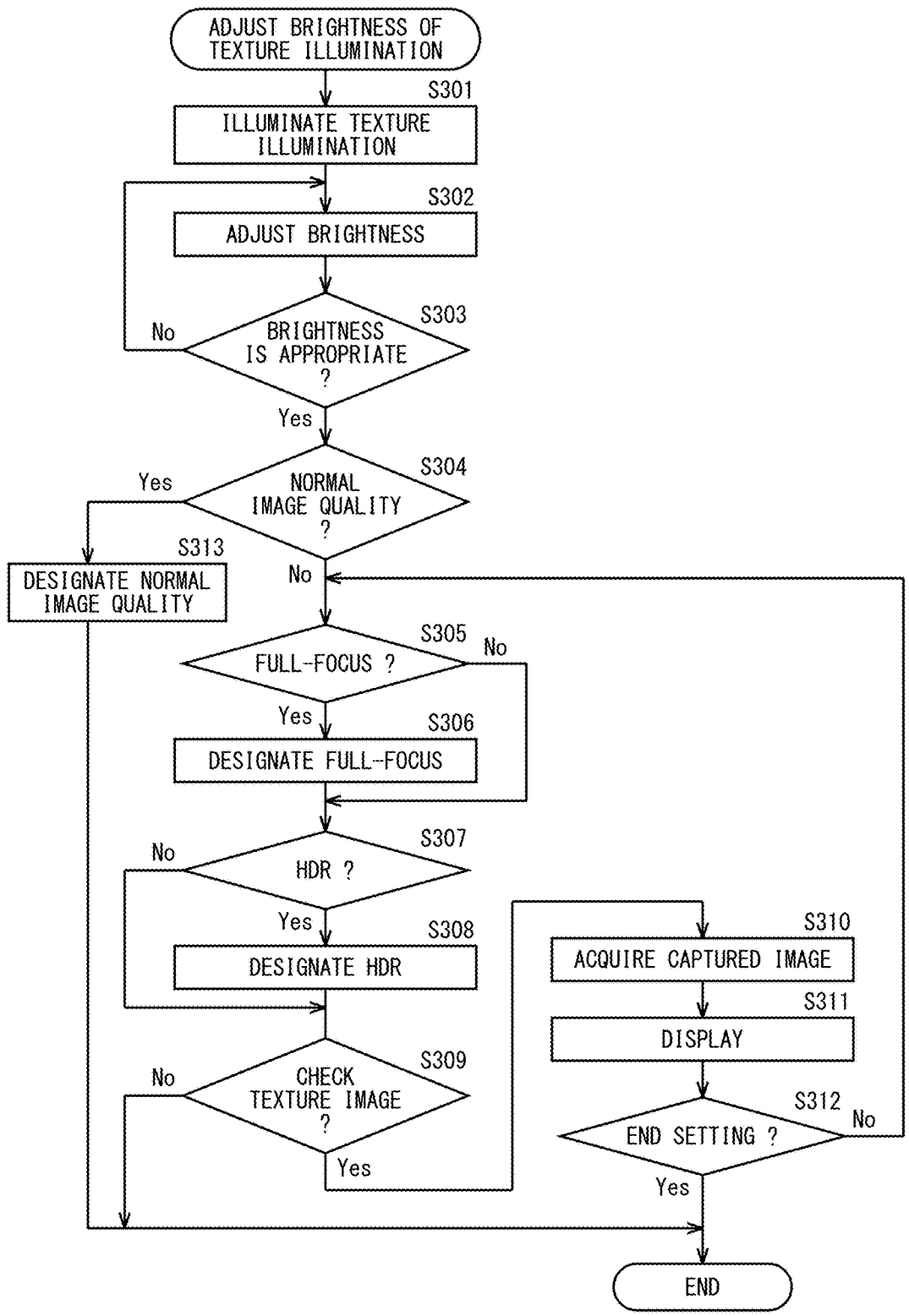
FIG. 5 is a flowchart showing an example of detailed operation of step S102 (adjustment of brightness of texture illumination) in FIG. 3.

FIG. 5 is a flowchart showing, in steps S301 to S313, an example of detailed operation of step S102 (adjustment of brightness of texture illumination) in FIG. 3, and shows an operation of the three-dimensional measurement device 1. First, the three-dimensional measurement device 1 illuminates texture illumination (step S301), and receives adjustment of brightness by the user (step S302). If the brightness at a measurement portion is not appropriate (step S303), the three-dimensional measurement device 1 repeats the procedure in step S302, and receives again adjustment of brightness by the user.

Next, the three-dimensional measurement device 1 receives selection of image quality of a texture image by the user (step S304), and if normal image quality is selected, the three-dimensional measurement device 1 designates the normal image quality, registers, as setting information, the illumination conditions and the capturing conditions designated by the user, and ends the process (step S313).

On the other hand, if full-focus image quality is selected by the user, the three-dimensional measurement device 1 designates the full-focus image quality (steps S305, S306). The full-focus image quality is image quality that is achieved by a depth composition process, and an entirely focused image can be obtained by compositing a plurality of captured images which are acquired while changing the focal position.

Then, when high dynamic range (HDR) image quality is selected by the user, the three-dimensional measurement device 1 designates the HDR image quality (steps S307, S308). According to the HDR image quality, a high dynamic range image can be obtained by synthesizing a plurality of captured images which are acquired while changing the exposure time.

Next, when checking of a texture image is indicated by the user (step S309), the three-dimensional measurement device 1 acquires a captured image based on the illumination conditions and the capturing conditions designated by the user (step S310), creates a texture image and displays the image by the display unit 51 (step S311).

The three-dimensional measurement device 1 repeats the procedure from steps S305 to S311 until end of setting is indicated by the user, and when end of setting is indicated by the user, the three-dimensional measurement device 1 registers, as setting information, the illumination conditions and the capturing conditions designated by the user, and ends the process (step S312).

Figure 6:
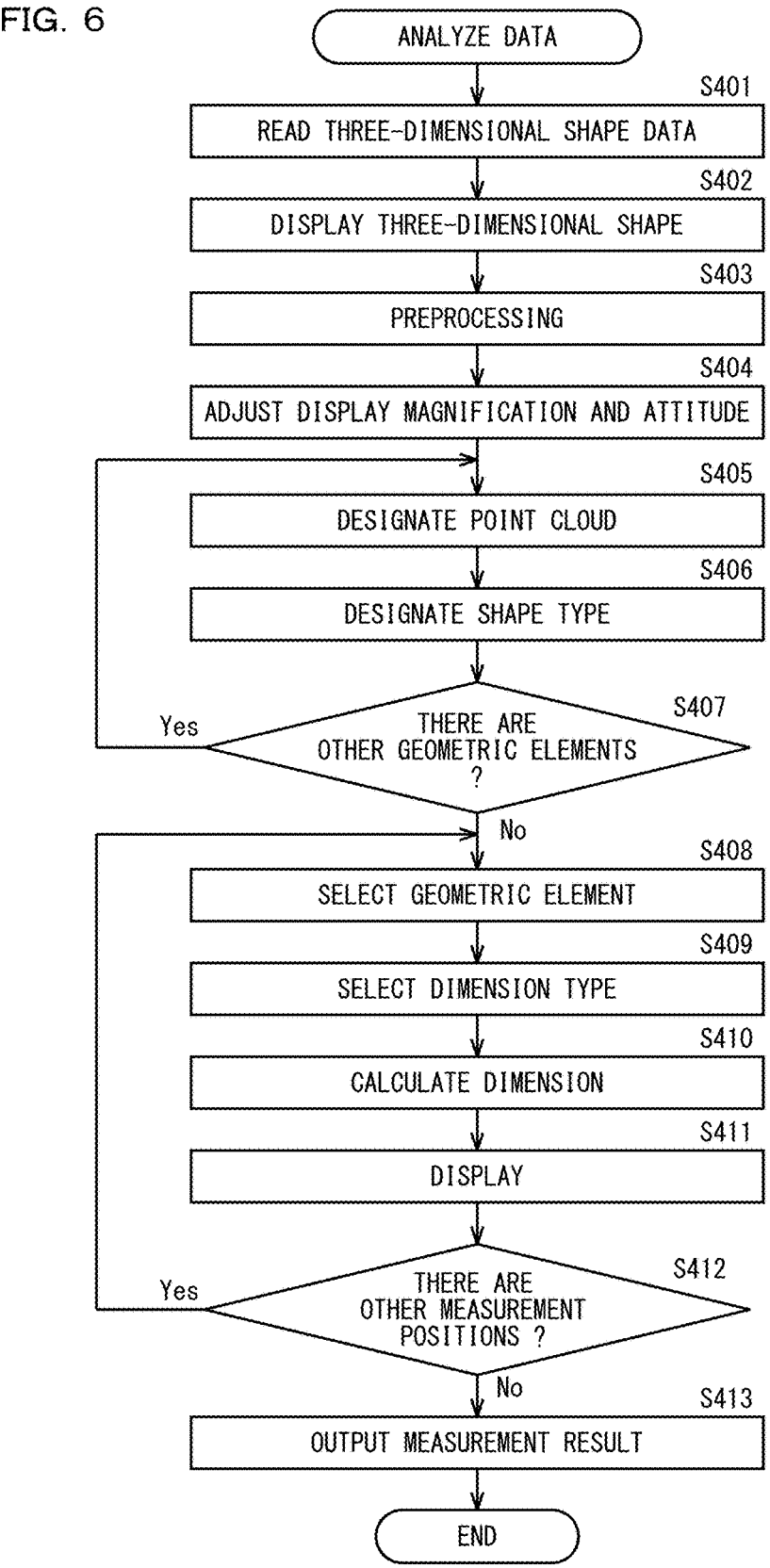
FIG. 6 is a flowchart showing an example of detailed operation of step S113 (data analysis) in FIG. 3.

FIG. 6 is a flowchart showing, in steps S401 to S413, an example of detailed operation of step S113 (data analysis) in FIG. 3, and shows an operation of the three-dimensional measurement device 1. First, the three-dimensional measurement device 1 reads, based on a user operation, three-dimensional shape data according to a predetermined data format, and displays the three-dimensional shape of the measurement target object W by the display unit 51 (steps S401, S402).

Next, the three-dimensional measurement device 1 performs preprocessing such as noise removal, filling, deletion of unnecessary data, and the like (step S403), and receives adjustment of display magnification and attitude by the user (step S404).

Next, the three-dimensional measurement device 1 receives designation of a point cloud, from the three-dimensional shape being displayed, for extracting a geometric element at the measurement position (step S405). Then, the three-dimensional measurement device 1 receives designation of a shape type for the geometric element (step S406). The shape type may be a point, a line, a circle, a plane, a sphere, a cylinder, a cone, or the like. The order of steps S405 and S406 may be reversed.

The three-dimensional measurement device 1 repeats the procedure in steps S405 and S406 until designation of a point cloud and the shape type is complete for all the geometric elements (step S407), and when designation of a point cloud and the shape type is complete, selection of a geometric element by the user is received (step S408). Then, the three-dimensional measurement device 1 receives selection of a dimension type for the selected geometric element (step S409). The dimension type may be a distance, an angle, a geometric tolerance, a diameter, or the like. The order of steps S408 and S409 may be reversed.

Next, the three-dimensional measurement device 1 specifies a geometric element by fitting a basic shape with a point cloud for the selected geometric element, and calculates a dimension value between the geometric elements (step S410). Then, the three-dimensional measurement device 1 displays the dimension value in association with the measurement position on the three-dimensional shape of the measurement target object W (step S411). If there are other desired measurement positions, the three-dimensional measurement device 1 repeats the procedure from steps S408 to S411 (step S412), and if there are no other desired measurement positions, the three-dimensional measurement device 1 outputs the measurement result, and ends the process (step S413).

Next, a more detailed configuration of the three-dimensional measurement device 1 according to the first embodiment of the present invention will be described below with reference to FIGS. 7 to 16.

<Information Processing Terminal 5>

Figure 7:
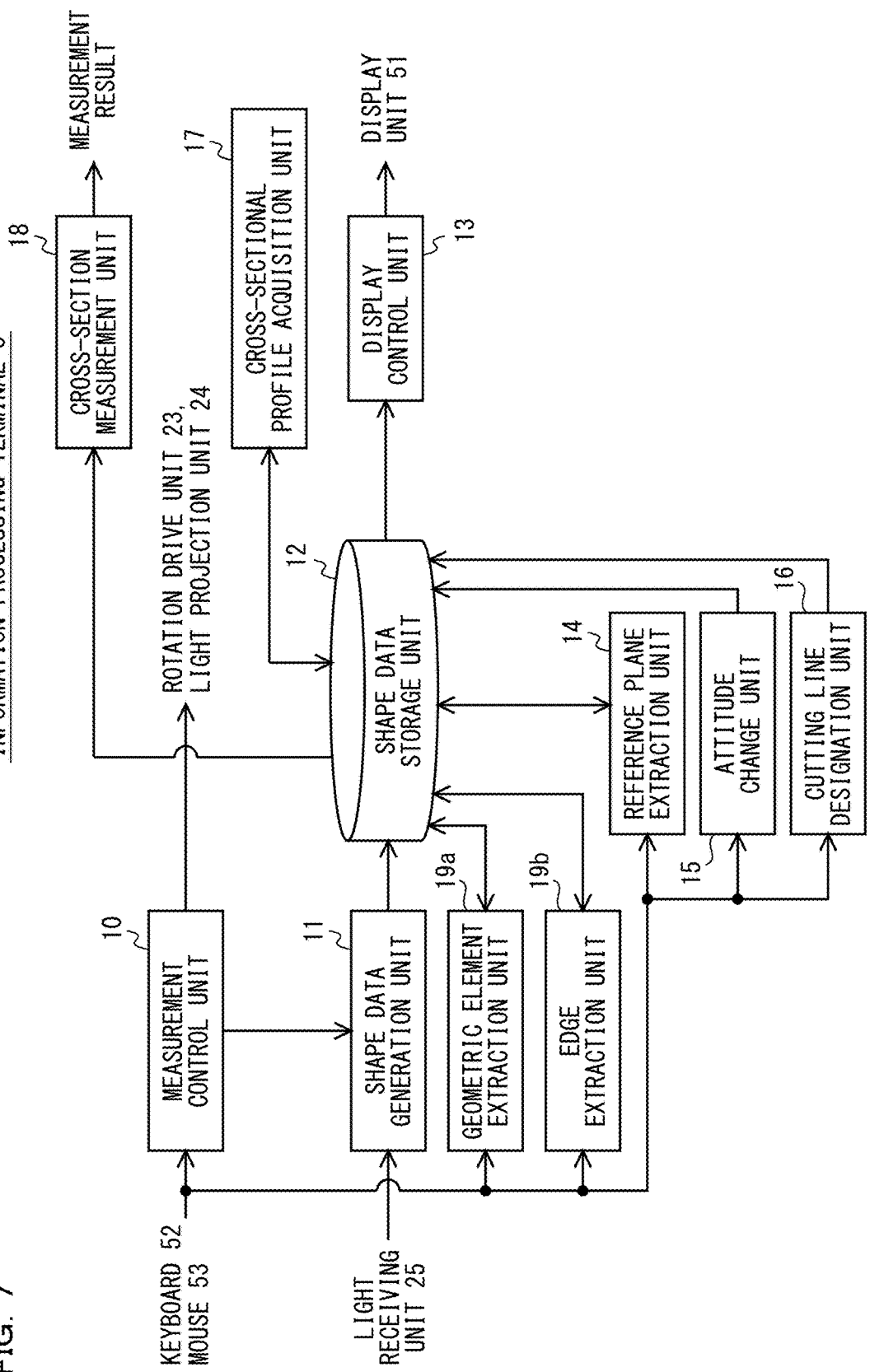
FIG. 7 is a block diagram showing an example of a functional configuration of an information processing terminal in FIG. 1.

FIG. 7 is a block diagram showing an example of a functional configuration of the information processing terminal 5 in FIG. 1. The information processing terminal 5 is configured from a measurement control unit 10, a shape data generation unit 11, a shape data storage unit 12, a display control unit 13, a reference plane extraction unit 14, an attitude change unit 15, a cutting line designation unit 16, a cross-sectional profile acquisition unit 17, a cross-section measurement unit 18, a geometric element extraction unit 19a, and an edge extraction unit 19b.

The measurement control unit 10 adjusts the imaging angle by controlling the rotation drive unit 23 based on a user operation by the keyboard 52 or the mouse 53, and controls radiation of measurement light by the light projection unit 24.

The shape data generation unit 11 generates three-dimensional shape data representing the three-dimensional shape of a measurement target object W based on a received light signal from the light receiving unit 25, and stores the data in the shape data storage unit 12. The three-dimensional shape data consists of pieces of position information of a plurality of measurement points in a three-dimensional space, and is created from a plurality of pattern images, each of which is acquired every time a stripe pattern projected, as measurement light, on the measurement target object W is moved. Three-dimensional shape data which have been previously measured are held in the shape data storage unit 12.

The display control unit 13 controls the display unit 51, based on the three-dimensional shape data in the shape data storage unit 12, and displays the three-dimensional shape of the measurement target object W on a measurement screen. For example, the three-dimensional shape is displayed on the measurement screen in such a manner that an object body having a large number of measurement points which are arranged three-dimensionally is seen from a predetermined point of view. The position of the three-dimensional shape (object body) in the measurement screen, the point of view, and the display magnitude may be arbitrarily designated.

The reference plane extraction unit 14 specifies, based on designation of a position from a three-dimensional shape being displayed, a plane which is to be used as a reference at the time of cutting the three-dimensional shape, and takes the shape as the reference plane. Designation of a position is performed based on a user operation by the keyboard 52 or the mouse 53, and a point cloud for extracting a plane as a geometric element is selected. The point cloud consists of at least two measurement points, and is selected by designation, by mouse operation or the like, of a figure, such as a polygon, enclosing a desired point cloud on the measurement screen. Furthermore, by designating one position on the three-dimensional shape on the measurement screen by mouse operation or the like, a point cloud including the position and fitting the plane is selected. The reference plane is specified as a basic shape fitted with the selected point cloud.

A well-known statistical method may be used as the method for fitting the basic shape with a point cloud. For example, the three-dimensional position, the attitude and the size of a geometric element are specified by a least squares method based on distances between the basic shape and the measurement points constituting the point cloud. Position information of the reference plane is stored in the shape data storage unit 12.

Furthermore, the reference plane extraction unit 14 determines, based on the shape of the reference plane, the reference axis and the rotation center of the reference plane. Because a point cloud is finite, an extracted reference plane is a plane shape having a finite edge. For example, in the case where a reference plane is substantially rectangular, a straight line parallel to the long side is designated as the reference axis, and an intersection of diagonal lines is designated as the rotation center. Also, the reference plane extraction unit 14 takes a coordinate plane designated in advance with respect to a three-dimensional shape as a reference plane. In the same manner, in the case where an extracted reference plane is other than a rectangle, a coordinate plane where the normal line of the reference plane, the principal axis of inertia of the reference plane extracted as the reference axis, and the center of gravity of the reference plane shape as the rotation center are designated is taken as the reference plane.

To cause the reference plane to be normally faced, the attitude change unit 15 rotates the three-dimensional shape in such a way that the normal line of the reference plane is orthogonal to the measurement screen. Also, to cause the reference plane to be oriented in the vertical direction or the lateral direction, the attitude change unit 15 rotates the three-dimensional shape in such a way that the normal line of the reference plane is parallel to the vertical direction or the lateral direction of the measurement screen.

The attitude change unit 15 rotates the three-dimensional shape in such a way that the reference axis determined in the reference plane coincides with the vertical direction or the lateral direction of the measurement screen. Also, in the case where the reference plane is normally faced, the attitude change unit 15 rotates, based on a user operation by the keyboard 52 or the mouse 53, the three-dimensional shape around a straight line that passes through the rotation center determined in the reference plane and that is perpendicular to the measurement screen. Furthermore, in the case where the reference plane is oriented in the vertical direction or the lateral direction, the attitude change unit 15 rotates the three-dimensional shape around a straight line that passes through the rotation center determined in the reference plane and that is perpendicular to the measurement screen.

The cutting line designation unit 16 receives designation of a cutting line in the measurement screen. Position information of the cutting line is stored in the shape data storage unit 12. The cutting line designation unit 16 determines a cutting line based on designation of a position from a three-dimensional shape whose attitude has been changed by rotation, for example. Designation of the position is performed based on a user operation by the keyboard 52 or the mouse 53, and, for example, a line segment connecting two positions designated by the user on the screen is designated as the cutting line.

The cross-sectional profile acquisition unit 17 acquires a cross-sectional profile from three-dimensional shape data in the shape data storage unit 12, and stores the cross-sectional profile in the shape data storage unit 12. The cross-sectional profile is shape data representing the shape of a cut surface obtained by cutting, along the cutting line, three-dimensional shape whose attitude has been changed by rotation. The cut surface is a plane or a curved surface which is perpendicular to the measurement screen.

The cross-section measurement unit 18 performs dimension measurement based on a cross-sectional profile acquired by the cross-sectional profile acquisition unit 17. For example, the dimension measurement is performed by designating a measurement position, the shape of a measurement element and the dimension type for the cross-sectional profile displayed on the measurement screen. The measurement result of the dimension value is displayed superimposed on the cross-sectional profile being displayed on the measurement screen.

The geometric element extraction unit 19a specifies a geometric element based on designation of a position from a three-dimensional shape being displayed. Designation of a position is performed based on a user operation by the keyboard 52 or the mouse 53. A geometric element is specified by selecting a point cloud by designation of a position and fitting a basic shape designated in advance with the selected point cloud.

The cutting line designation unit 16 determines a cutting line based on a projection figure of a geometric element extracted by the geometric element extraction unit 19a and projected on the measurement screen. Specifically, if the geometric element is a plane, the line of intersection between the plane and the measurement screen is designated as the cutting line. Also, if the geometric element is a cylinder, a projection figure of the central axis of the cylinder projected on the measurement screen, that is, a straight line, is designated as the cutting line. Moreover, a straight line created by reusing the intersection of the central axis of the cylinder and the reference plane (measurement screen) as a point and further designating another point may be used as the cutting line.

The edge extraction unit 19b extracts an edge from a projection image, which is the three-dimensional shape projected on the measurement screen, based on designation of a position on the measurement screen. The edge is extracted based on luminance. The projection image here may be a distance image obtained by replacing the position, in the projection direction, of three-dimensional shape data corresponding to an outermost surface in the projection direction, that is, the distance in the direction perpendicular to the measurement screen, by luminance information, or may be a texture image corresponding to texture information of three-dimensional shape data corresponding to an outermost surface in the projection direction. The cutting line designation unit 16 determines the cutting line based on the edge extracted by the edge extraction unit 19b. For example, a straight line that is perpendicular to, or that is parallel to and separated by a predetermined distance from, a straight line that is fitted with a plurality of edge points is designated as the cutting line. Furthermore, a circle that is concentric with and separated by a predetermined distance from a circle that is fitted with a plurality of edge points is designated as the cutting line.

<Measurement Screen 6>

Figure 8:
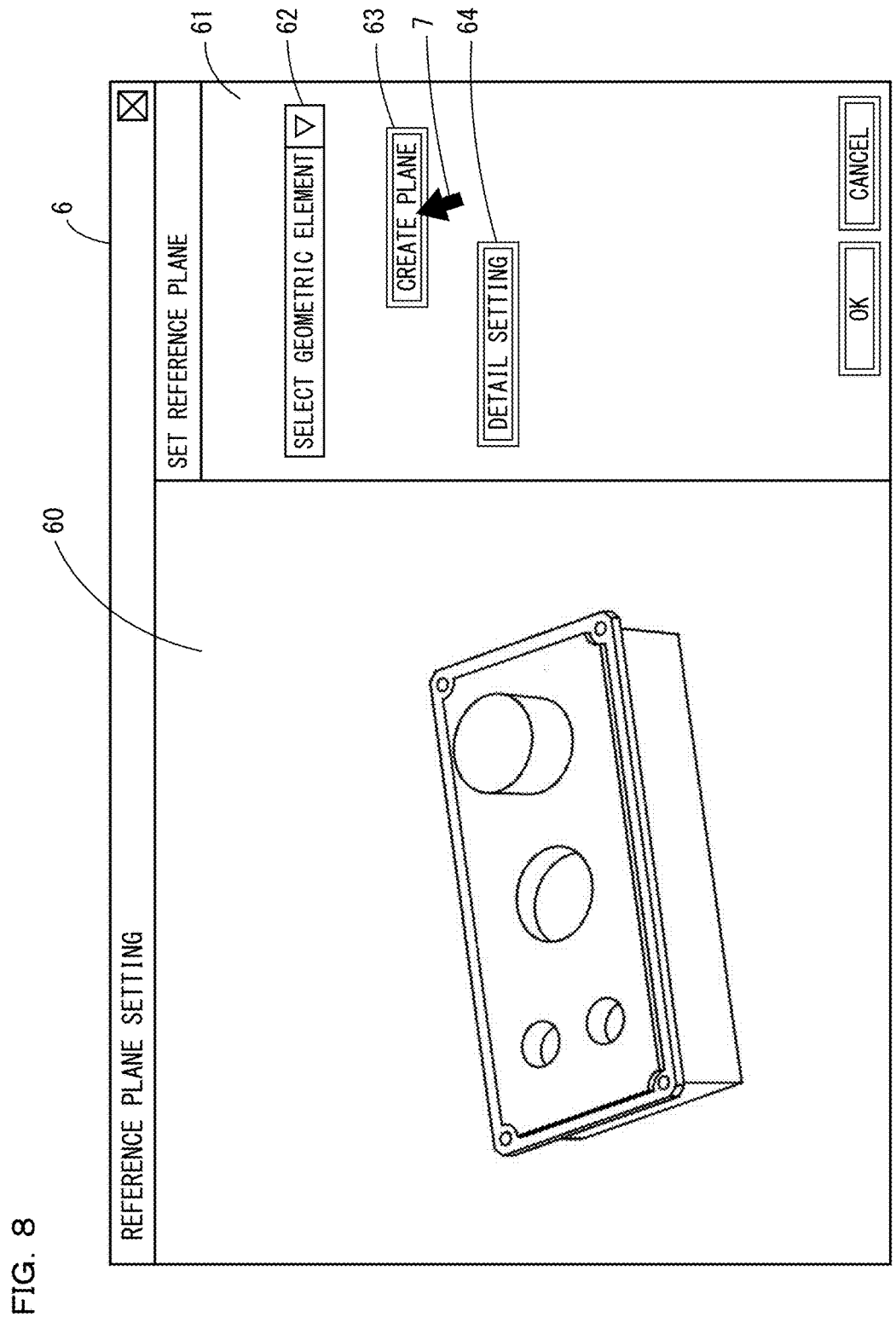
FIG. 8 is a diagram showing an example of operation at the time of setting of a reference plane at the information processing terminal in FIG. 7.

FIG. 8 is a diagram showing an example of operation at the time of setting of a reference plane at the information processing terminal 5 in FIG. 7, and shows a measurement screen 6 which is displayed by the display unit 51. The measurement screen 6 is an operation screen for performing dimension measurement on a cut surface obtained by cutting a three-dimensional shape, and is displayed by the display unit 51 at the time of setting of a reference plane.

The measurement screen 6 includes a three-dimensional shape display section 60 for displaying a three-dimensional shape of a measurement target object W, and an operation section 61 for designating a reference plane. The operation section 61 is arranged on the right of the three-dimensional shape display section 60. A pull-down menu 62, a create button 63, and a detail setting button 64 are arranged in the operation section 61.

The pull-down menu 62 is an operation object used to designate a reference plane by using geometric elements which were extracted in the past. By operating the pull-down menu 62, geometric elements which were previously extracted from the three-dimensional shape being displayed are displayed as a list. A geometric element selected from the pull-down menu 62 may be designated as the reference plane.

The create button 63 is an operation icon used to newly create a reference plane. The create button 63 may be operated by performing a click operation in a state where a mouse pointer 7 is on the create button 63. The detail setting button 64 is an operation icon used to rotate the three-dimensional shape so that the reference plane is placed at a specific attitude with respect to the measurement screen 6, or to designate, as the reference plane, a coordinate plane which is designated in advance with respect to the three-dimensional shape.

Figure 9:
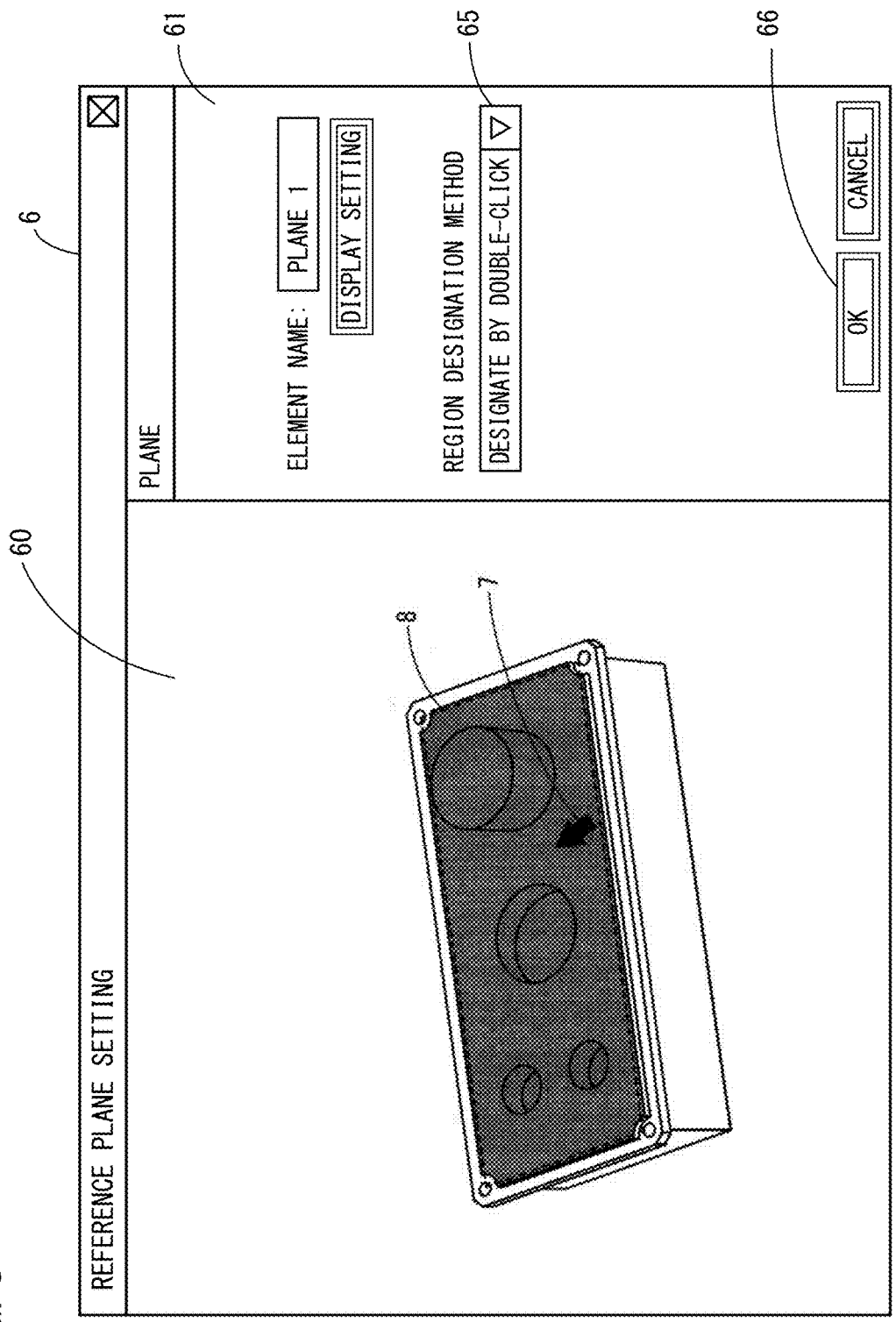
FIG. 9 is a diagram showing an example of operation at the time of setting of a reference plane at the information processing terminal in FIG. 7, and shows a measurement screen after extraction of a reference plane from a three-dimensional shape being displayed.

FIG. 9 is a diagram showing an example of operation at the time of setting of a reference plane at the information processing terminal 5 in FIG. 7, and shows the measurement screen 6 after extraction of a reference plane 8 from a three-dimensional shape being displayed. The measurement screen 6 is a reference plane creation screen that is displayed when the create button 63 is operated, and an element name input section, a display setting button, a designation method input section 65, an OK button 66, and a cancel button are arranged in the operation section 61.

An element name is automatically assigned to a newly created reference plane 8. Also, a display mode of the reference plane 8, such as a display color, may be changed by operating the display setting button. The input section 65 is an operation object used to select a designation method of a region where a reference plane is to be extracted, and designation methods that can be selected are displayed as a list in the form of a pull-down menu.

The designation methods of a region may be a method of designating by a click operation, a method of designating by a combination of a key operation and a click operation, a method of designating by a plurality of points, a method of designating by a drag operation, and the like. According to the method of designating by a click operation, a click operation is performed in a state where a position on a three-dimensional shape is designated by the mouse pointer 7, and the plane at the position is automatically extracted as the reference plane 8.

The reference plane 8 extracted from the three-dimensional shape is displayed in a manner distinguishable from the extraction source three-dimensional shape. For example, the reference plane 8 is colored in red, and is displayed superimposed on the three-dimensional shape. Furthermore, the reference plane 8 is a rectangular region. When the OK button 66 is operated, the reference plane 8 extracted from the three-dimensional shape is established, and an attitude change process for rotating the three-dimensional shape so that the reference plane 8 will be at a specific attitude with respect to the measurement screen 6 is performed.

Figure 10:
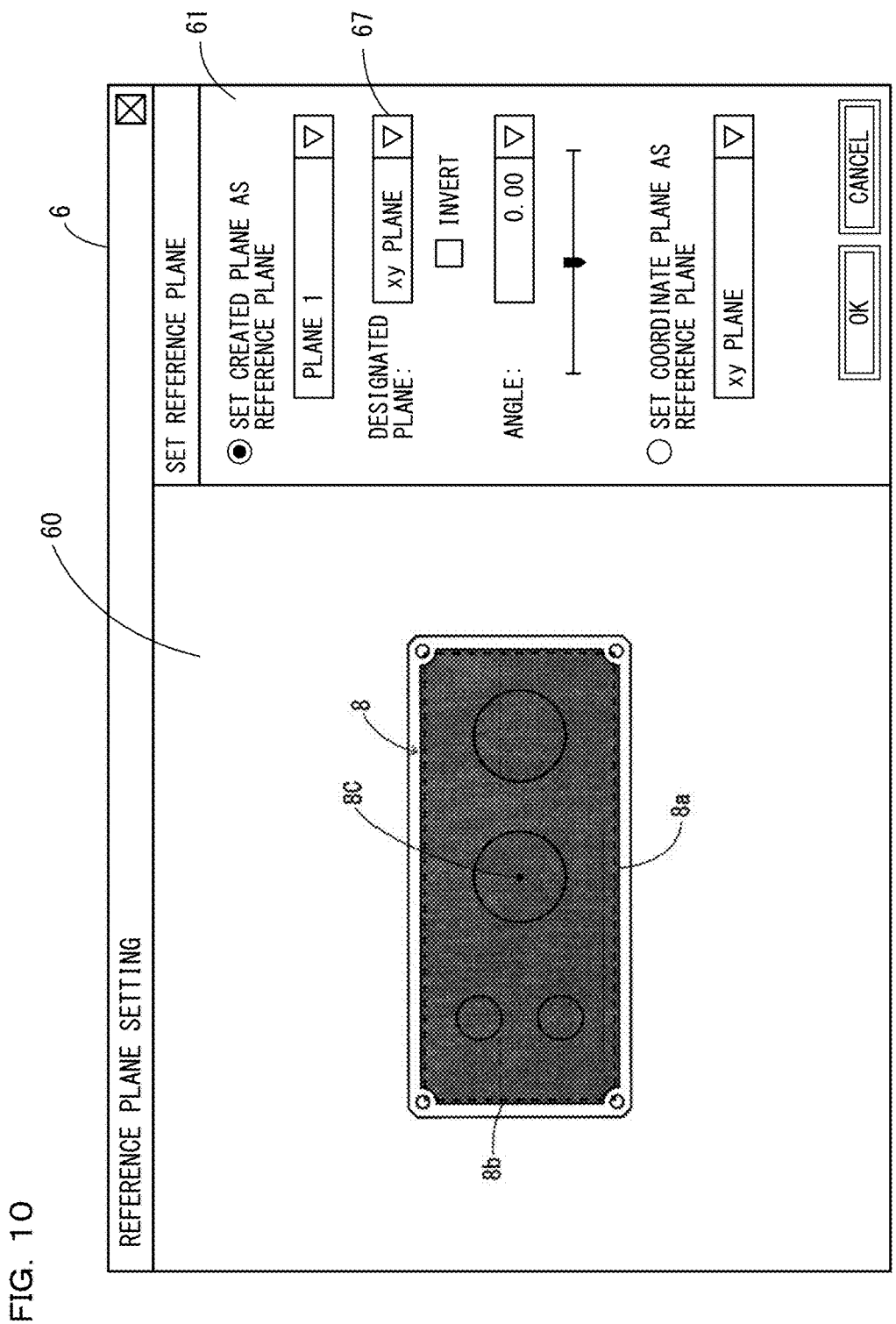
FIG. 10 is a diagram showing an example of operation at the time of setting of a reference plane at the information processing terminal in FIG. 7, and shows the measurement screen after the reference plane is normally faced.

FIG. 10 is a diagram showing an example of operation at the time of setting of a reference plane at the information processing terminal 5 in FIG. 7, and shows the measurement screen 6 after the reference plane 8 is normally faced. The measurement screen 6 is a setting screen for a reference plane that is displayed when the reference plane 8 is designated, and the three-dimensional shape which has been rotated so that the reference plane 8 normally faces the measurement screen 6 is displayed in the three-dimensional shape display section 60. That the reference plane 8 normally faces the measurement screen 6 means that the normal line of the reference plane 8 is orthogonal to the measurement screen 6.

The reference plane 8 is a rectangle having a long side 8a and a short side 8b, and the long side 8a is designated as the reference axis, and an intersection 8c of diagonal lines is designated as the rotation center. The three-dimensional shape in the three-dimensional shape display section 60 is arranged in such a way that the reference plane 8 normally faces the measurement screen 6 and the reference axis of the reference plane 8 is coincident with the lateral direction of the measurement screen 6. Moreover, the three-dimensional shape is arranged in such a way that the rotation center of the reference plane 8 is positioned substantially at the center of the three-dimensional shape display section 60. According to such a configuration, the visual quality when the three-dimensional shape is rotated so that the reference plane 8 is positioned at a specific attitude with respect to the measurement screen 6 may be enhanced.

The operation section 61 includes a designated plane input section 67, an invert box, a rotation angle input section, and a coordinate plane designation section. The input section 67 is an operation object used to designate the attitude of the reference plane 8, and any of an xy plane, a yz plane, and a zx plane may be selected from the pull-down menu.

In this case, the measurement screen 6 is designated as the xy plane, and the lateral direction is the x-axis and the vertical direction is the y-axis. If the yz plane is designated as the designated plane, the three-dimensional shape is rotated in such a way that the reference plane 8 is parallel to the yz plane. Also, if the zx plane is designated as the designated plane, the three-dimensional shape is rotated in such a way that the reference plane 8 is parallel to the zx plane.

The invert box is an input section used to invert the reference plane 8, and the three-dimensional shape may be rotated, by input of a check mark, so as to invert the front and the back of the reference plane 8. The rotation angle input section is an input section used to rotate the three-dimensional shape around a straight line that is perpendicular to the measurement screen 6, and the rotation angle is designated by incrementing or decrementing a numerical value or by moving a slider.

If the xy plane is designated as the designated plane, the three-dimensional shape may be rotated around a straight line that passes through the rotation center of the reference plane 8 and that is perpendicular to the measurement screen 6. According to such a configuration, the visual quality when the three-dimensional shape is rotated so that the reference plane 8 is positioned at a specific attitude with respect to the measurement screen 6 may be enhanced.

Figure 11:
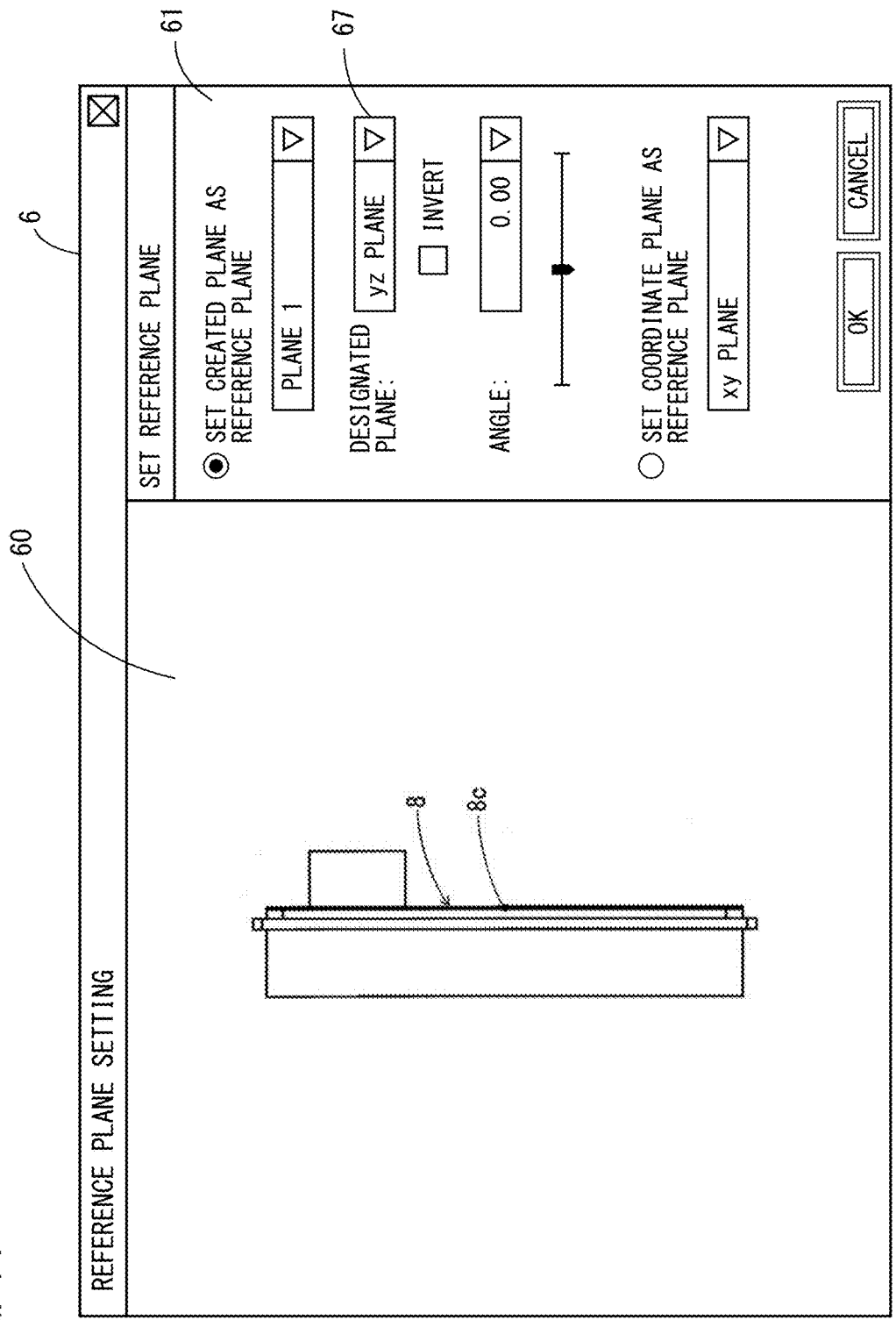
FIG. 11 is a diagram showing an example of operation at the time of setting of a reference plane at the information processing terminal in FIG. 7, and shows the measurement screen where the reference plane is oriented in a lateral direction.

FIG. 11 is a diagram showing an example of operation at the time of setting of a reference plane at the information processing terminal 5 in FIG. 7, and shows the measurement screen 6 where the reference plane 8 is oriented in a lateral direction. The measurement screen 6 is a setting screen for a case where the yz plane is designated as the designated screen, and the three-dimensional shape which has been rotated so that the normal line of the reference plane 8 is made parallel to the lateral direction of the measurement screen 6 is displayed in the three-dimensional shape display section 60.

In this case, the long side 8*a* of the reference plane 8 is designated as the reference axis. The three-dimensional shape in the three-dimensional shape display section 60 is arranged in such a way that the normal line of the reference plane 8 is parallel to the lateral direction of the measurement screen 6 and the reference axis of the reference plane 8 is coincident with the vertical direction of the measurement screen 6. Also, the three-dimensional shape is arranged in such a way that the intersection 8*c* of the reference plane 8 is positioned substantially at the center of the three-dimensional shape display section 60. The three-dimensional shape may be rotated around a straight line that passes through the intersection 8*c* and that is perpendicular to the measurement screen 6 by designating a rotation angle.

Figure 12:
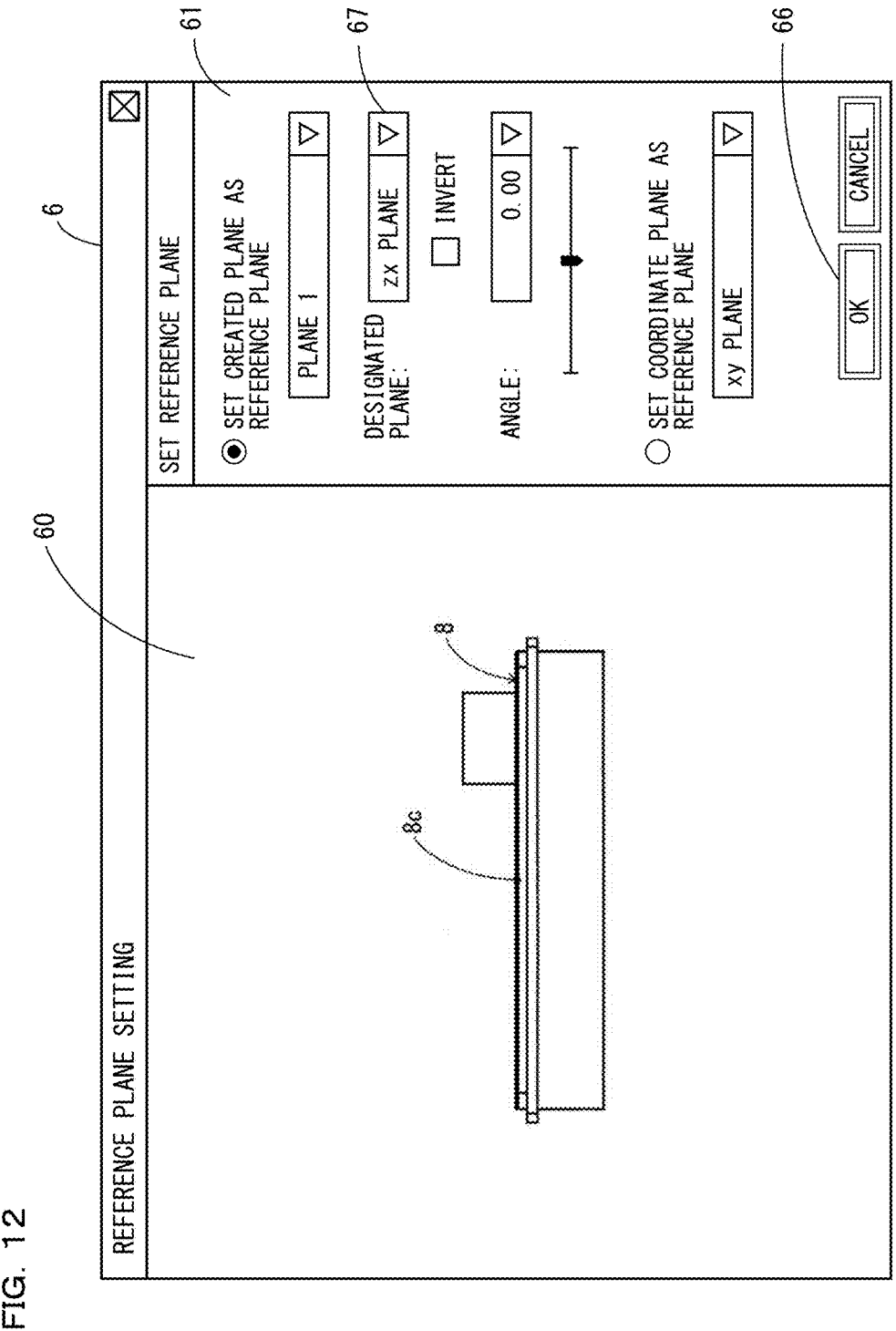
FIG. 12 is a diagram showing an example of operation at the time of setting of a reference plane at the information processing terminal in FIG. 7, and shows the measurement screen where the reference plane is oriented in a vertical direction.

FIG. 12 is a diagram showing an example of operation at the time of setting of a reference plane at the information processing terminal 5 in FIG. 7, and shows the measurement screen 6 where the reference plane 8 is oriented in a vertical direction. The measurement screen 6 is a setting screen for a case where the zx plane is designated as the designated screen, and the three-dimensional shape which has been rotated so that the normal line of the reference plane 8 is made parallel to the vertical direction of the measurement screen 6 is displayed in the three-dimensional shape display section 60.

Also in this case, the long side 8*a* of the reference plane 8 is designated as the reference axis. The three-dimensional shape in the three-dimensional shape display section 60 is arranged in such a way that the normal line of the reference plane 8 is parallel to the vertical direction of the measurement screen 6 and the reference axis of the reference plane 8 is coincident with the lateral direction of the measurement screen 6. Also, the three-dimensional shape is arranged in such a way that the intersection 8*c* of the reference plane 8 is positioned substantially at the center of the three-dimensional shape display section 60. The three-dimensional shape may be rotated around a straight line that passes through the intersection 8*c* and that is perpendicular to the measurement screen 6 by designating a rotation angle.

Figure 13:
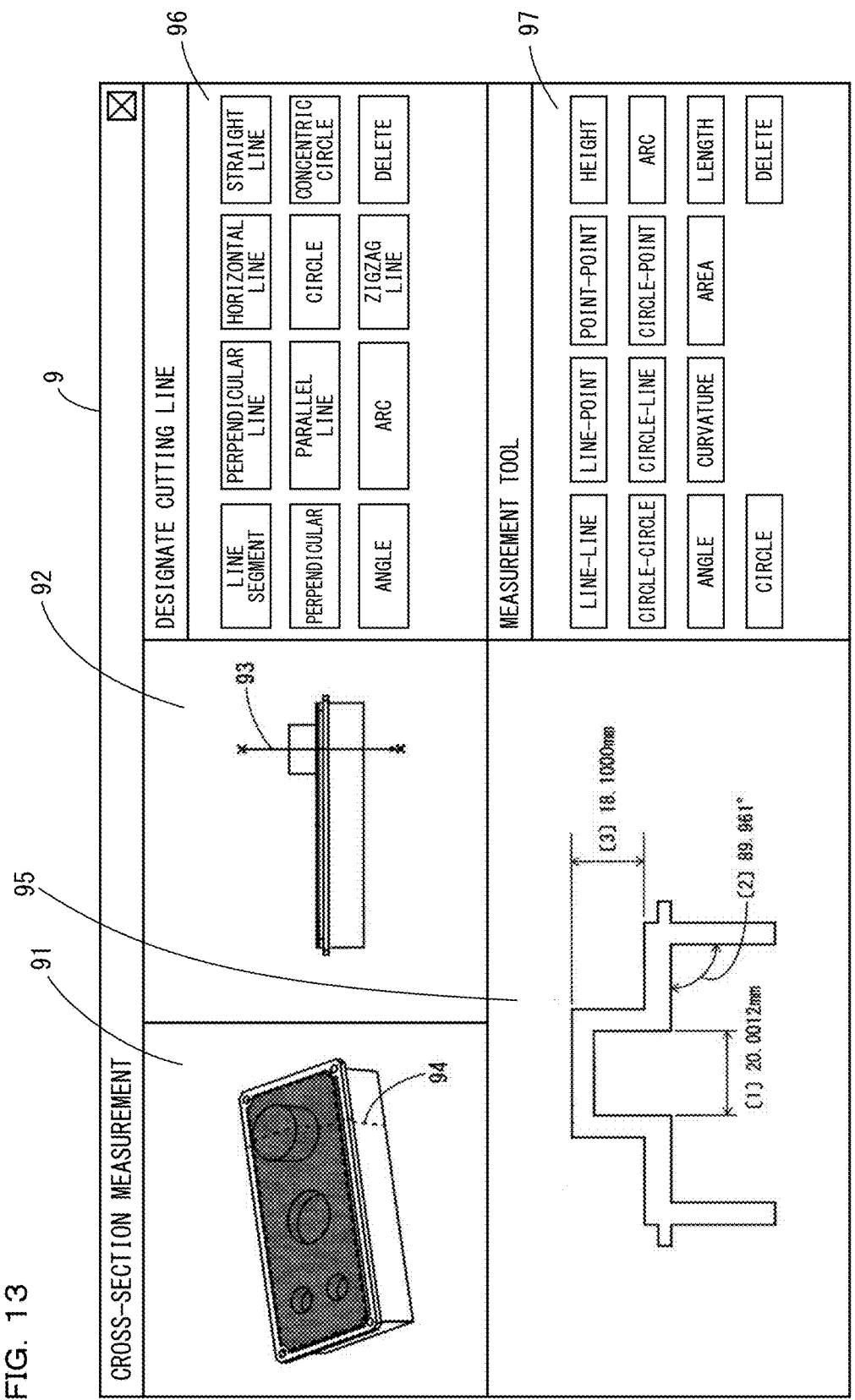
FIG. 13 is a diagram showing an example of operation at the time of cross-section measurement at the information processing terminal in FIG. 7.

FIG. 13 is a diagram showing an example of operation at the time of cross-section measurement at the information processing terminal 5 in FIG. 7, and shows a measurement screen 9 which is displayed by the display unit 51. The measurement screen 9 is an operation screen for performing dimension measurement on a cut surface obtained by cutting a three-dimensional shape, and is displayed by the display unit 51 at the time of cross-section measurement.

The measurement screen 9 includes a three-dimensional shape display section 91, a projection image display section 92, a cross-sectional profile display section 95, and operation sections 96 and 97. The display sections 91, 92 and the operation section 96 are arranged on the upper half of the measurement screen 9, and the display section 95 and the operation section 97 are arranged on the lower half. The display section 91 is arranged on the left of the display section 92, and the operation section 96 is arranged on the right of the display section 92. The operation section 97 is arranged on the right of the display section 95.

The three-dimensional shape of a measurement target object W is displayed in the display section 91. For example, a three-dimensional shape after extraction of the reference plane 8 is displayed. The display section 92 is a display section for displaying a projection image obtained by projecting the three-dimensional shape on the measurement screen 9, and the projection image is created from a three-dimensional shape which has been rotated such that the reference plane 8 is positioned at a specific attitude with respect to the measurement screen 9. For example, a projection image corresponding to a three-dimensional shape which has been rotated in such a way that the normal line of the reference plane 8 is parallel to the vertical direction of the measurement screen 6 is displayed.

Tool buttons for designating a cutting line 93, and a delete button for deleting the cutting line 93 are arranged in the operation section 96. By operating the tool button, the cutting line 93 for acquiring a cross-sectional profile may be designated for the projection image being displayed in the display section 92. The cutting line 93 is a one-dimensional geometric figure in the measurement screen 9.

Designation methods that can be selected by the tool buttons include a line segment, a perpendicular line, a horizontal line, a straight line, a perpendicular, a parallel line, a circle, a concentric circle, an angle, an arc, and a zigzag line. For example, according to a designation method based on a line segment, two points are designated on the projection image, and a line segment connecting the two points by a straight line is designated as the cutting line 93. According to a designation method based on a perpendicular line, one point is designated on the projection image, and a straight line passing through the point along the vertical direction (y-direction) is designated as the cutting line 93.

A shape line 94 showing the position of a cut surface of the three-dimensional shape that is cut along the cutting line 93 is displayed on the three-dimensional shape in the display section 91. The display section 95 is a display section for displaying a cross-sectional profile showing the shape of the cut surface of the three-dimensional shape that is cut along the cutting line 93. The vertical direction of the display section 95 corresponds to the direction along the cutting line 93, and the lateral direction of the display section 95 corresponds to the direction perpendicular to the measurement screen 9. When a line segment is designated as the cutting line 93, a plane including the designated line segment and extending in the direction perpendicular to the measurement screen 9 is made the cut surface. Furthermore, when a circle is designated as the cutting line 93, a cylindrical surface including the designated circle and extending in the direction perpendicular to the measurement screen 9 is made the cut surface. In this case, the vertical direction of the display section 95 corresponds to the direction along the cutting line 93, that is, the circumferential direction of the designated circle. When a zigzag line is designated as the cutting line 93, the vertical direction of the display section 95 corresponds to the direction along the cutting line 93, that is, the direction along the designated zigzag line. An example is described here where the vertical direction of the display section 95 corresponds to the direction along the cutting line 93 and the lateral direction of the display section 95 corresponds to the direction perpendicular to the measurement screen 9, but the correspondence relationship may be switched between the vertical direction and the lateral direction, or the direction along the cutting line 93 and the direction perpendicular to the measurement screen 9 may correspond to arbitrary directions in the display section 95.

When the cutting line 93 is designated from a projection image where the reference plane 8 normally faces the measurement screen 9, the three-dimensional shape is cut by a plane and/or a curved surface which are perpendicular to the reference plane 8. On the other hand, when the cutting line 93 is designated from a projection image where the reference plane 8 is oriented in the vertical direction or the lateral direction of the measurement screen 9, the three-dimensional shape may be cut by a plane which is parallel to the reference plane 8.

Tool buttons for designating a dimension type, and a delete button for deleting a dimension value or a dimension line are arranged in the operation section 97. A dimension type may be designated by operating the tool button, and dimension measurement may be performed on the cross-sectional profile being displayed in the display section 95.

Dimension types that can be selected by the tool buttons include line-line, line-point, point-point, height, circle-circle, circle-line, circle-point, arc, angle, curvature, area, length, and circle. For example, in the case of line-line, two line segments are designated in a measurement element, and the distance between the line segments is determined as the dimension value. Regarding angle, two line segments are designated in a measurement element, and an angle formed by the line segments is determined as the dimension value.

A measurement value obtained by performing dimension measurement on the cross-sectional profile is displayed in association with the measurement position. In this example, dimension measurement is performed at three measurement positions, and respective measurement values are displayed.

Figure 14:
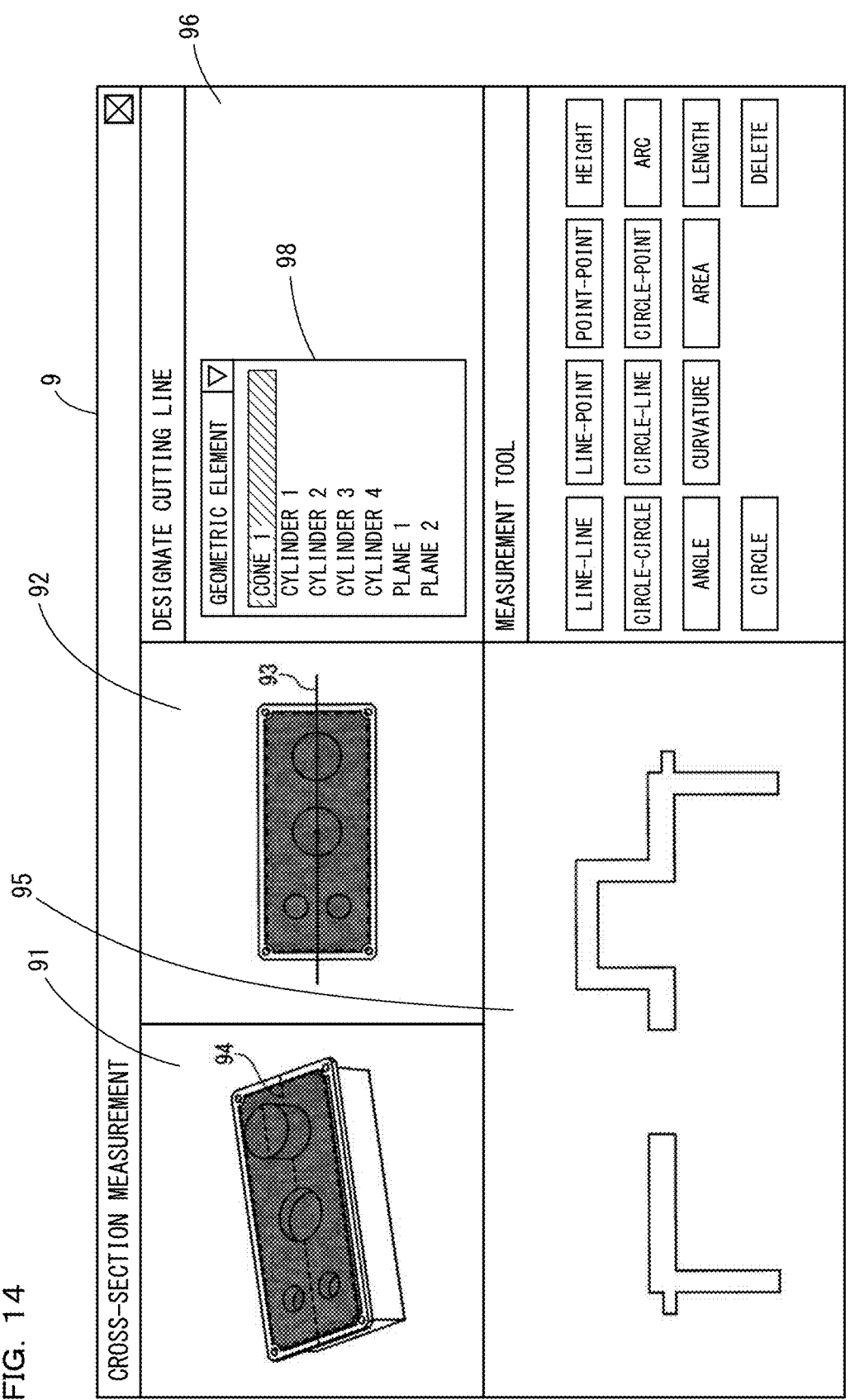
FIG. 14 is a diagram showing an example of operation at the time of cross-section measurement at the information processing terminal in FIG. 7, and shows a case of designating a cutting line by using a geometric element extracted from the three-dimensional shape.

FIG. 14 is a diagram showing an example of operation at the time of cross-section measurement at the information processing terminal 5 in FIG. 7, and shows a case of designating the cutting line 93 by using a geometric element extracted from the three-dimensional shape. A geometric element list 98 is displayed in the operation section 96 of the measurement screen 9. The geometric element list 98 includes one or more geometric elements extracted from the three-dimensional shape, and the cutting line 93 may be designated by using the geometric element. The cutting line 93 is determined based on a projection figure obtained by projecting the geometric element on the measurement screen 9.

For example, if a conical surface and a cylindrical surface are extracted as the geometric elements, a straight line connecting an intersection of the central axis of the conical surface and the measurement screen 9 and the intersection of the central axis of the cylindrical surface and the measurement screen 9 is designated as the cutting line 93. The shape of the cut surface of the three-dimensional shape that is cut along the cutting line 93 is displayed in the display section 95 as the cross-sectional profile. If the cutting line 93 is designated by using a geometric element extracted from the three-dimensional shape, the three-dimensional shape can be cut by using a surface that cannot be seen in the projection image or a part where edge extraction is difficult.

Figure 15:
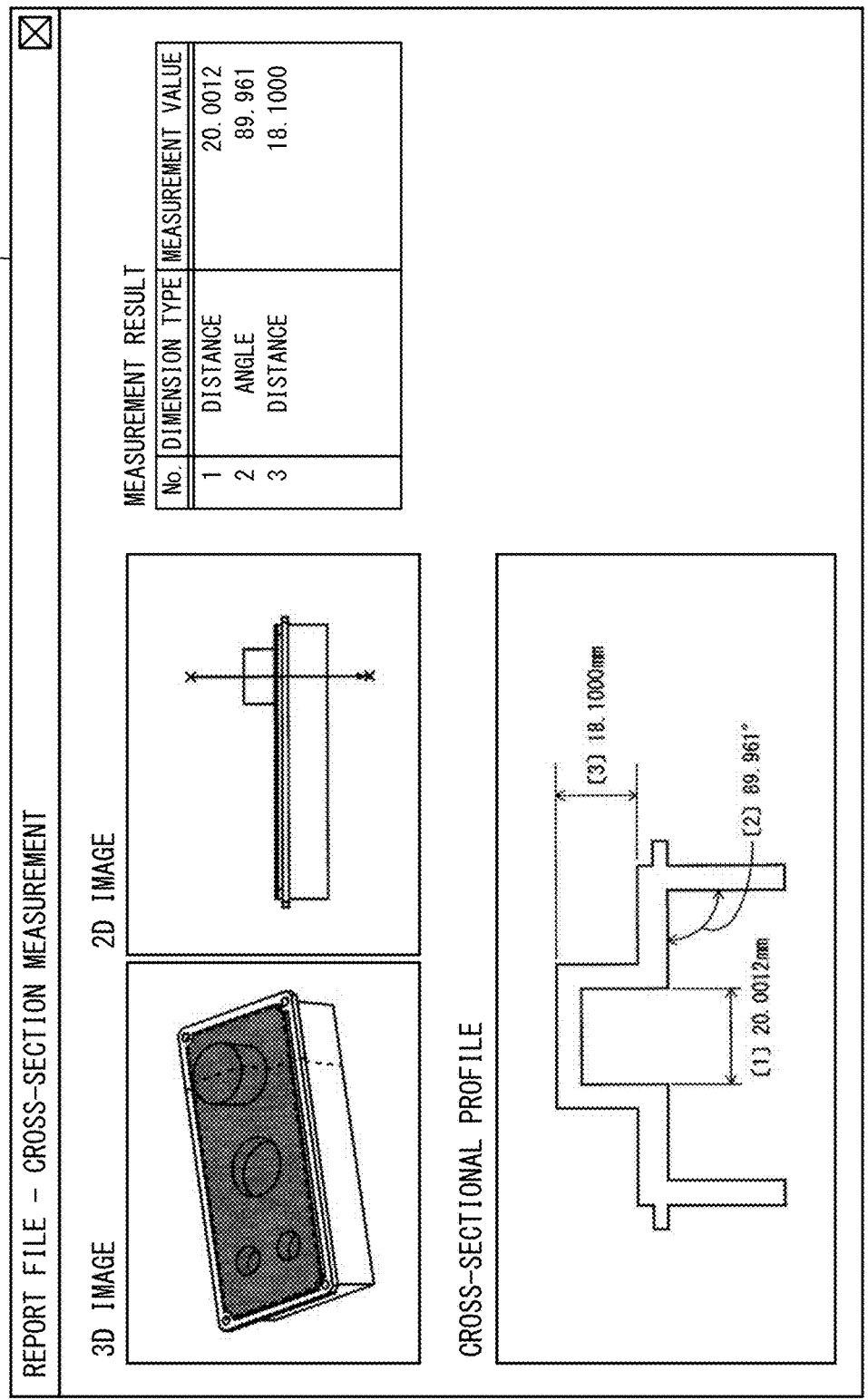
FIG. 15 is a diagram showing an example of operation at the time of report file output at the information processing terminal in FIG. 7.

FIG. 15 is a diagram showing an example of operation at the time of report file output at the information processing terminal 5 in FIG. 7, and shows a report screen 100 which is displayed by the display unit 51. The report screen 100 is an edit screen for recording, or printing, a result of cross-section measurement as a report file, and includes a 3D image display section, a 2D image display section, a cross-sectional profile display section, and a measurement result display section.

The three-dimensional shape of a measurement target object W is displayed in the 3D image display section, and a projection image obtained by projecting the three-dimensional shape on the measurement screen 9 is displayed in the 2D image display section. The shape of the cut surface of the three-dimensional shape that is cut along the cutting line 93 is displayed as the cross-sectional profile in the cross-sectional profile display section. Results of dimension measurement for the cross-sectional profile are displayed as a list in the measurement result display section.

Figure 16:
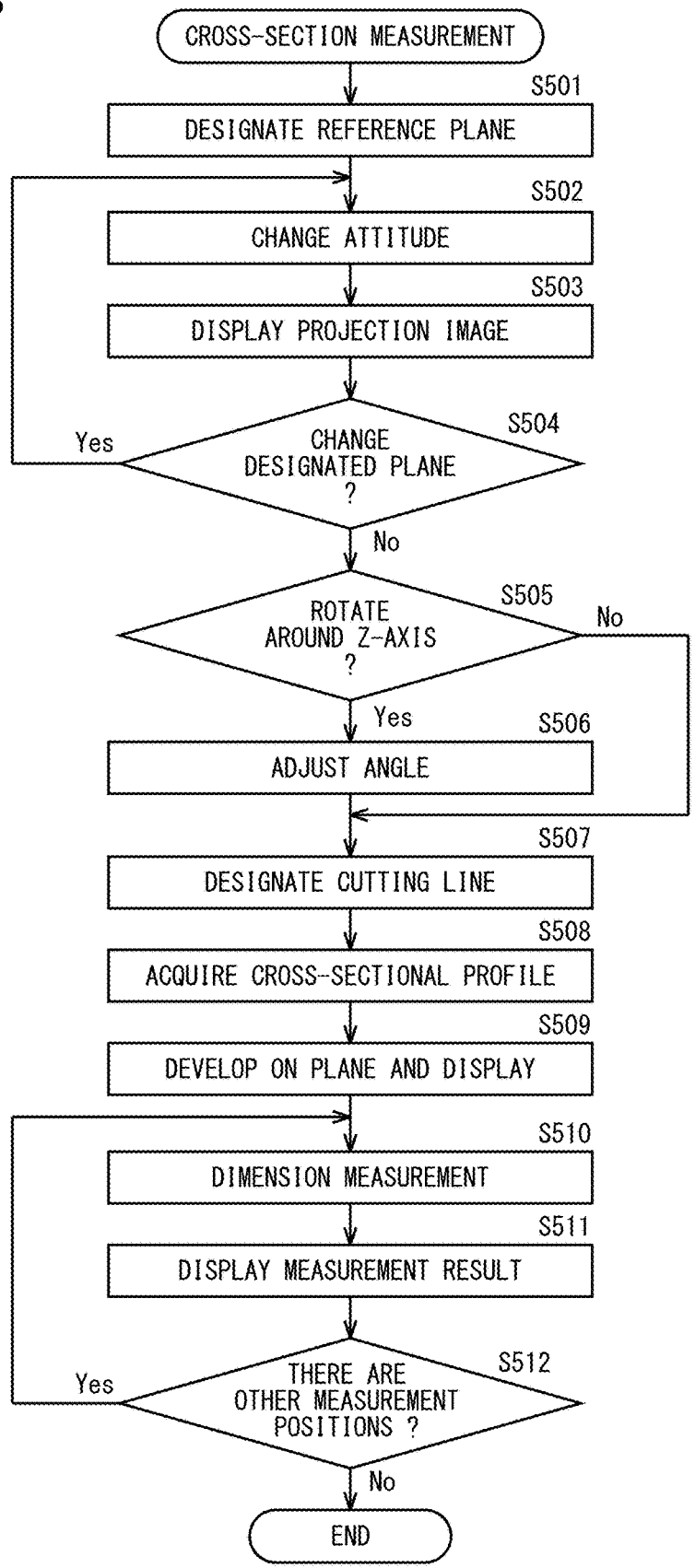
FIG. 16 is a flowchart showing an example of operation at the time of cross-section measurement at the information processing terminal in FIG. 7.

FIG. 16 is a flowchart showing, in steps S501 to S512, an example of operation at the time of cross-section measurement at the information processing terminal 5 in FIG. 7. First, the information processing terminal 5 designates the reference plane 8 for a three-dimensional shape which is being displayed as a 3D image on the measurement screen 9 (step S501), and rotates the three-dimensional shape in such a way that the reference plane 8 is positioned at a specific attitude with respect to the measurement screen 9 (step S502).

Next, the information processing terminal 5 projects the rotated three-dimensional shape on the measurement screen 9 and acquires a projection image, and displays the image on the measurement screen 9 as a 2D image (step S503). If a user operation for changing the designated plane is performed, the information processing terminal 5 repeats the procedure in steps S502 and S503 (step S504). If a user operation for changing the designated plane is performed, the attitude of the reference plane 8 is changed based on the user operation. On the other hand, if a user operation for changing the designated plane is not performed, the xy plane is automatically designated as the designated plane, and the three-dimensional shape is rotated in such a way that the reference plane 8 normally faces the measurement screen 9.

Next, if a user operation for changing the rotation angle is performed (step S505), the information processing terminal 5 performs angle adjustment by rotating the projection image around a z-axis, that is, around an axis that is perpendicular to the measurement screen 9, based on the user operation (step S506).

Next, when the cutting line 93 is designated on the measurement screen 9 (step S507), the information processing terminal 5 acquires the cross-sectional profile showing the shape of the cut surface of the three-dimensional shape that is cut along the cutting line 93 (step S508), develops the shape on the plane and displays the same on the measurement screen 9 (step S509). The information processing terminal 5 performs dimension measurement on the cross-sectional profile (step S510), and superimposes and displays the measurement result on the cross-sectional profile (step S511). If another measurement position is designated, the information processing terminal 5 repeats the procedure in steps S510 and S511, and ends the process when dimension measurement is complete for all the measurement positions (step S512).

According to the present embodiment, because the reference plane 8 is positioned at a specific attitude with respect to the measurement screen 9, where and by which cutting line 93 the three-dimensional shape should be cut to obtain a desired cut surface from the three-dimensional shape which is to be cut along the cutting line 93 can be intuitively grasped. Furthermore, the cutting line 93 is a one-dimensional geometric figure in the measurement screen 9, and the cut surface is perpendicular to the measurement screen 9, and thus, compared to a case where a two-dimensional cut surface is directly designated in a three-dimensional space, designation of a cut surface is facilitated. Moreover, because dimension measurement is performed based on a cross-sectional profile of a desired cut surface, a measurement position, the shape of a measurement element, and the dimension type may be intuitively designated. Moreover, dimension measurement may be easily performed at a position indicated on a design drawing.

Second Embodiment

In the first embodiment, an example has been described for a case where the information processing terminal 5 has the function of cross-section measurement of acquiring a cross-sectional profile from three-dimensional shape data and performing dimension measurement. In a present embodiment, a case where an information processing terminal has a cross-section comparison function will be described.

Figure 17:
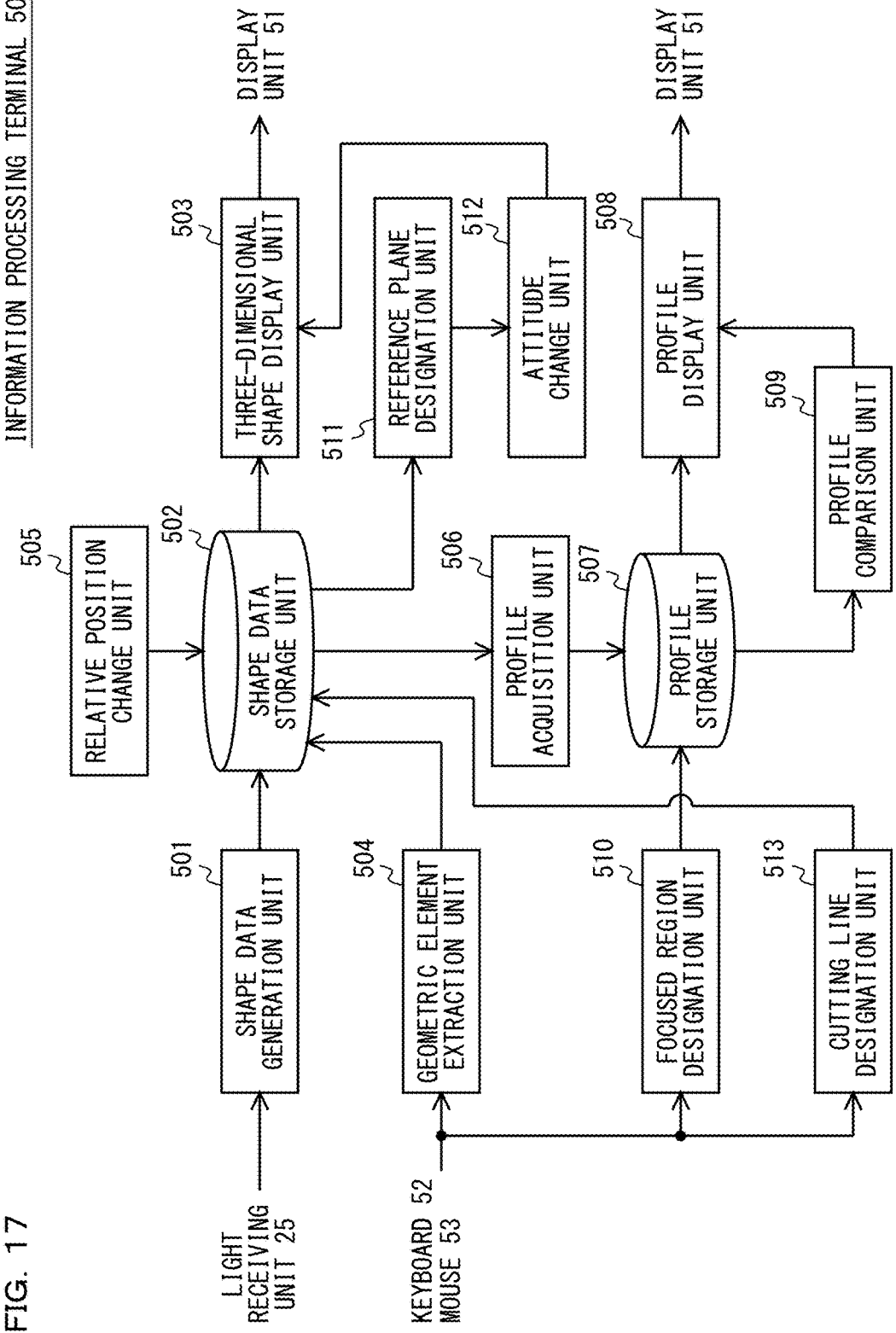
FIG. 17 is a block diagram showing an example configuration of a three-dimensional measurement device according to a second embodiment of the present invention, and shows an information processing terminal having a cross-section comparison function.

FIG. 17 is a block diagram showing an example configuration of a three-dimensional measurement device 1 according to a second embodiment of the present invention, and shows an information processing terminal 500 having a cross-section comparison function. The cross-section comparison function is a function of comparing two cross-sectional profiles against each other, and determining, and displaying on a measurement screen, the degree of shift or the position thereof.

The information processing terminal 500 is configured from a shape data generation unit 501, a shape data storage unit 502, a three-dimensional shape display unit 503, a geometric element extraction unit 504, a relative position change unit 505, a profile acquisition unit 506, a profile storage unit 507, a profile display unit 508, a profile comparison unit 509, a focused region designation unit 510, a reference plane designation unit 511, an attitude change unit 512, a cutting line designation unit 513, and a cross-section measurement unit 514.

The shape data generation unit 501 measures a three-dimensional shape of a measurement target object W, generates measurement three-dimensional shape data, and stores the measurement three-dimensional shape data in the shape data storage unit 502. Reference three-dimensional shape data, which is used as a reference at the time of shape comparison, is held in the shape data storage unit 502. As the reference three-dimensional shape data, CAD data which is created by CAD may be used, for example. Additionally, the reference three-dimensional shape data may be three-dimensional shape data acquired by measuring a master piece, or three-dimensional shape data which was measured in the past.

The three-dimensional shape display unit 503 reads the measurement three-dimensional shape data and the reference three-dimensional shape data from the shape data storage unit 502, controls the display unit 51, and displays, on a measurement screen, a measurement three-dimensional shape image showing the measurement three-dimensional shape and a reference three-dimensional shape image showing the reference three-dimensional shape. The measurement three-dimensional shape image is created based on the measurement three-dimensional shape data. For its part, the reference three-dimensional shape image is created based on the reference three-dimensional shape data.

The geometric element extraction unit 504 extracts a first geometric element and a second geometric element to be used for alignment from the measurement three-dimensional shape and the reference three-dimensional shape, respectively. The first geometric element is specified based on designation of a position from the measurement three-dimensional shape image being displayed. For its part, the second geometric element is specified based on designation of a position from the reference three-dimensional shape image being displayed. Designation of a position is performed based on a user operation by the keyboard 52 or the mouse 53.

The relative position change unit 505 changes the relative position of the measurement three-dimensional shape data and the reference three-dimensional shape data in such a way that the first geometric element and the second geometric element coincide with each other. That is, position information is transformed in such a way that the first geometric element on the measurement three-dimensional shape and the second geometric element on the reference three-dimensional shape overlap each other in space, with coincident position and attitude. For example, coordinate transformation is performed on the measurement three-dimensional shape data or the reference three-dimensional shape data in the shape data storage unit 502. Additionally, coordinate transformation may alternatively be performed on both the measurement three-dimensional shape data and the reference three-dimensional shape data.

The relative position change unit 505 associates sequentially specified first geometric element and second geometric element as geometric elements for alignment, and changes the relative position so that these geometric elements coincide with each other. Then, if the first geometric element and the second geometric element are again sequentially specified after the relative position is changed, the relative position change unit 505 changes the relative position so that these geometric elements also coincide with each other.

The profile acquisition unit 506 acquires, based on the measurement three-dimensional shape data and the reference three-dimensional shape data after change of the relative position, a measurement cross-sectional profile showing the cross-sectional shape of the measurement three-dimensional shape cut along a cut surface and a reference cross-sectional profile showing the cross-sectional shape of the reference three-dimensional shape cut along the cut surface. The measurement cross-sectional profile and the reference cross-sectional profile are stored in the profile storage unit 507.

The profile display unit 508 reads profile data from the profile storage unit 507, controls the display unit 51, and displays the measurement cross-sectional profile and the reference cross-sectional profile on the measurement screen in an overlapping manner.

The profile comparison unit 509 reads the measurement cross-sectional profile and the reference cross-sectional profile from the profile storage unit 507, compares the profiles against each other, and calculates a difference value between the measurement cross-sectional profile and the reference cross-sectional profile. The difference value indicates the shift between the measurement cross-sectional profile and the reference cross-sectional profile, and, for example, the difference value is determined as the distance, in the normal direction of the reference cross-sectional profile, from the reference cross-sectional profile to the measurement cross-sectional profile.

The focused region designation unit 510 designates, for the measurement cross-sectional profile and the reference cross-sectional profile being displayed, a focused region for displaying the difference value or emphasizing the shift. The focused region may be designated by designating a position on the measurement cross-sectional profile and the reference cross-sectional profile by mouse operation or the like.

The difference value is calculated for the measurement cross-sectional profile and the reference cross-sectional profile in the focused region. For example, a maximum difference value or an average difference value is calculated. The maximum difference value is the maximum value of difference values in the focused region. The average difference value is the average value of difference values in the focused region.

The profile display unit 508 displays the difference value in association with the measurement cross-sectional profile and the reference cross-sectional profile. Also, the profile display unit 508 colors a region between the measurement cross-sectional profile and the reference cross-sectional profile according to the polarity of the difference value. For example, the display color of a region is made different between a region where the polarity of the difference value is positive and a region where the polarity is negative. Display of a difference value and coloring of the cross-sectional profiles are performed on the measurement cross-sectional profile and the reference cross-sectional profile in the focused region. Also, the profile display unit 508 displays a graph that is changed according to the difference value by superimposing the graph on the measurement cross-sectional profile and the reference cross-sectional profile in the focused region.

The reference plane designation unit 511 designates, as the reference plane, from the measurement three-dimensional shape or the reference three-dimensional shape after change of the relative position, a plane which is to be used as a reference at the time of cutting the three-dimensional shape. As the reference plane, a plane which is extracted from the measurement three-dimensional shape as the first geometric element, or a plane which is extracted from the reference three-dimensional shape as the second geometric element is designated, for example. Additionally, as the reference plane, a plane may be newly extracted and designated from the measurement three-dimensional shape or the reference three-dimensional shape.

In order to cause the reference plane to be normally faced, the attitude change unit 512 changes the attitudes of the measurement three-dimensional shape and the reference three-dimensional shape in such a way that the normal line of the reference plane is orthogonal to the measurement screen. Also, in order to cause the reference plane to be oriented in the vertical direction or the lateral direction, the attitude change unit 512 changes the attitudes of the measurement three-dimensional shape and the reference three-dimensional shape in such a way that the normal line of the reference plane is parallel to the vertical direction or the lateral direction of the measurement screen. The cutting line designation unit 513 receives designation of a cutting line in the measurement screen.

The profile acquisition unit 506 takes a plane that includes the cutting line and that is perpendicular to the measurement screen as the cut surface, and acquires the measurement cross-sectional profile and the reference cross-sectional profile by cutting, along the cut surface, the measurement three-dimensional shape and the reference three-dimensional shape after change of attitudes.

The cross-section measurement unit 514 performs dimension measurement based on designation of a position from the measurement cross-sectional profile being displayed. Designation of a position is performed based on a user operation by the keyboard 52 or the mouse 53. The profile display unit 508 displays the result of dimension measurement in association with the measurement cross-sectional profile.

<Alignment Screen 300>

Figure 18:
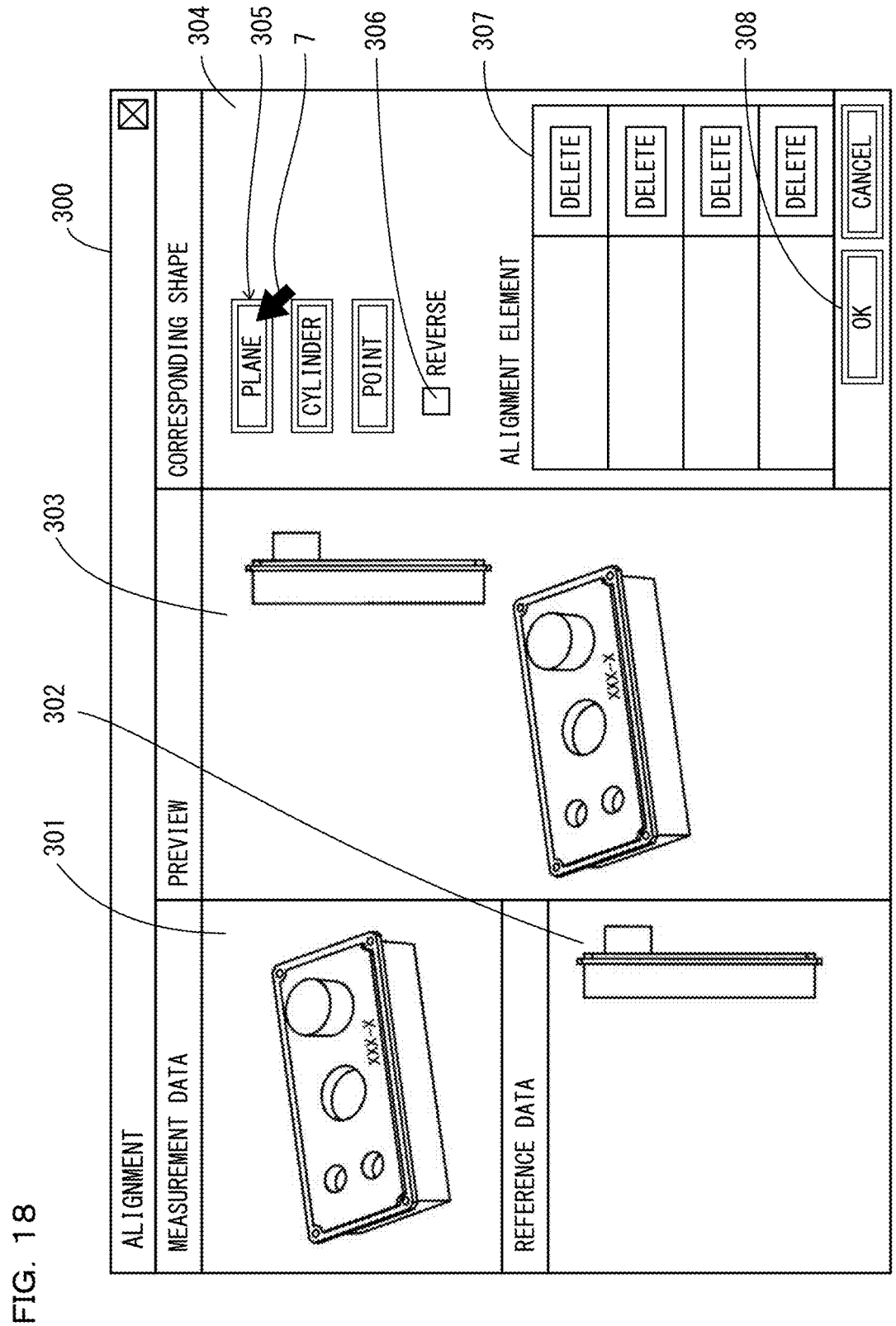
FIG. 18 is a diagram showing an example of operation at the time of alignment at the information processing terminal in FIG. 17, and shows an alignment screen which is displayed by a display unit.

FIGS. 18 to 21 are diagrams showing an example of operation at the time of alignment at the information processing terminal 500 in FIG. 17. FIG. 18 shows an alignment screen 300 which is displayed by the display unit 51. The alignment screen 300 is an operation screen for performing alignment between two pieces of shape data.

The alignment screen 300 includes a display section 301 for displaying measurement data, a display section 302 for displaying reference data, a preview section 303 for displaying the measurement data and the reference data in a common coordinate system, and an operation section 304 for designating a geometric element. The display sections 301 and 302 are arranged on the left of the preview section 303, and the operation section 304 is arranged on the right of the preview section 303.

A measurement three-dimensional shape is displayed in the display section 301, and a reference three-dimensional shape is displayed in the display section 302. The three-dimensional shapes are three-dimensionally displayed, and the display positions, the points of view, the attitudes and the like may be adjusted by mouse operation or the like.

Shape buttons 305 for designating the shape of a geometric element to be used for alignment, a reverse box 306 for reversing the direction of the geometric element, and an alignment element list 307 are arranged in the operation section 304. The shape button 305 is provided for each of three shape types: a plane, a cylinder, and a point.

For example, if the mouse pointer 7 is moved over the shape button 305 "plane" and the shape button 305 is operated by a click operation, a plane may be extracted from the measurement three-dimensional shape or the reference three-dimensional shape and be designated as a geometric element for alignment.

Figure 19:
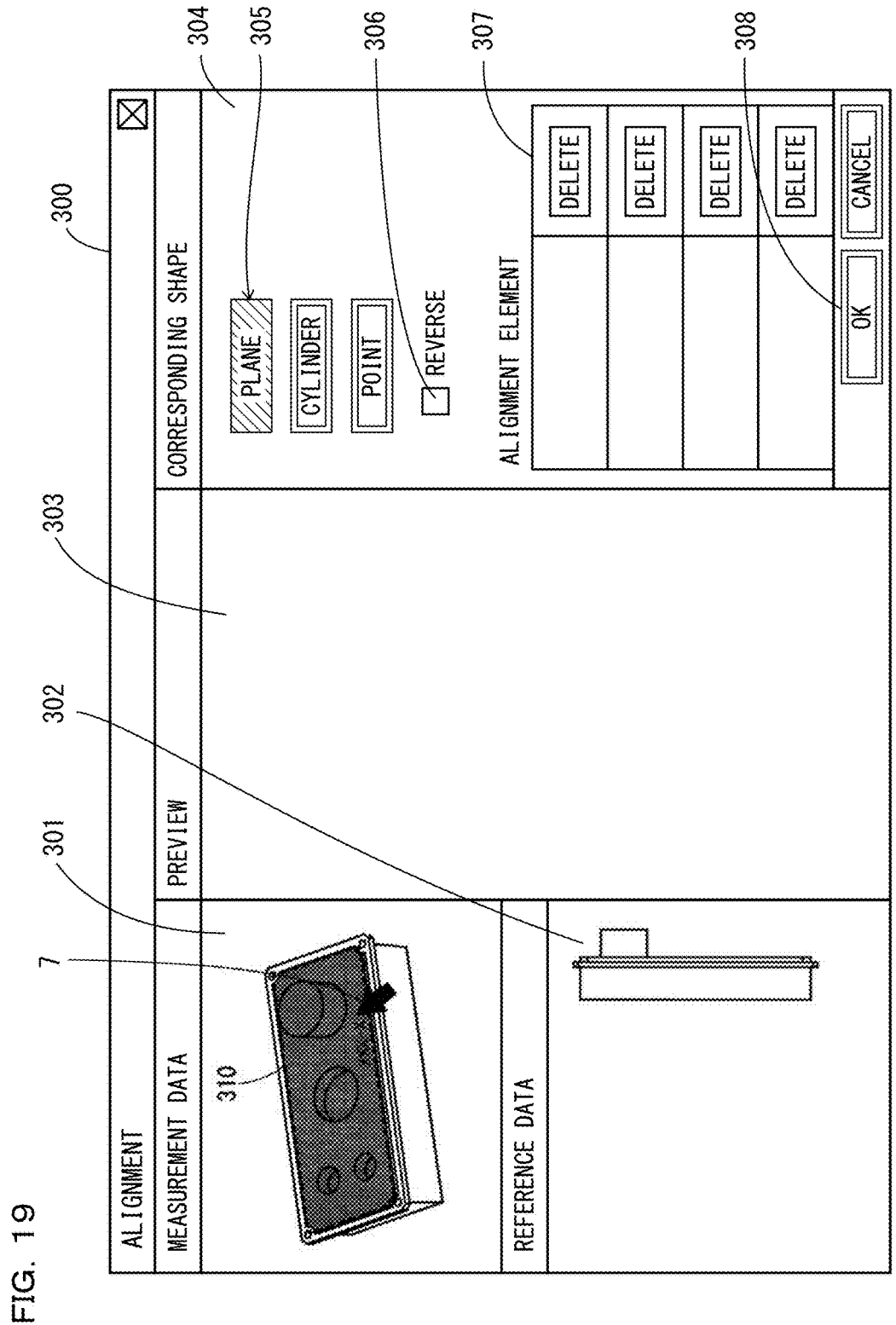
FIG. 19 is a diagram showing an example of operation at the time of alignment at the information processing terminal in FIG. 17, and shows a state after extraction of a first geometric element from measurement data.

FIG. 19 shows a state after extraction of a first geometric element 310 from measurement data. The first geometric element 310 is extracted from the measurement three-dimensional shape in the display section 301 by moving the mouse pointer 7 over a desired geometric element of the measurement three-dimensional shape and performing a click operation. The first geometric element 310 has a planar shape, and is displayed in a colored manner.

Figure 20:
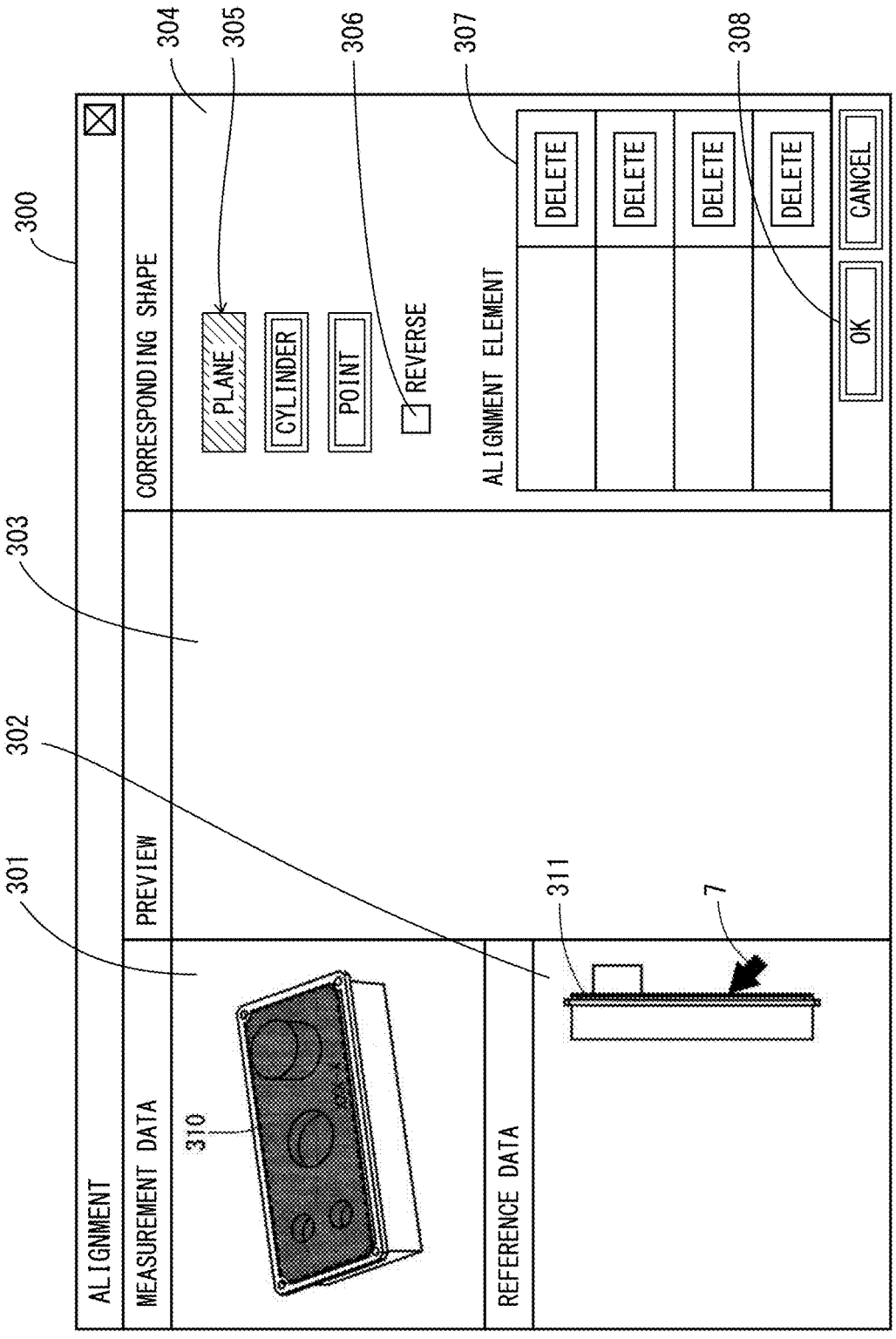
FIG. 20 is a diagram showing an example of operation at the time of alignment at the information processing terminal in FIG. 17, and shows a state after extraction of a second geometric element from reference data.

FIG. 20 shows a state after extraction of a second geometric element 311 from reference data. The second geometric element 311 is extracted from the reference three-dimensional shape in the display section 302 by moving the mouse pointer 7 over a geometric element corresponding to the first geometric element 310 and performing a click operation. The second geometric element 311 has a planar shape, and is displayed in a colored manner.

Figure 21:
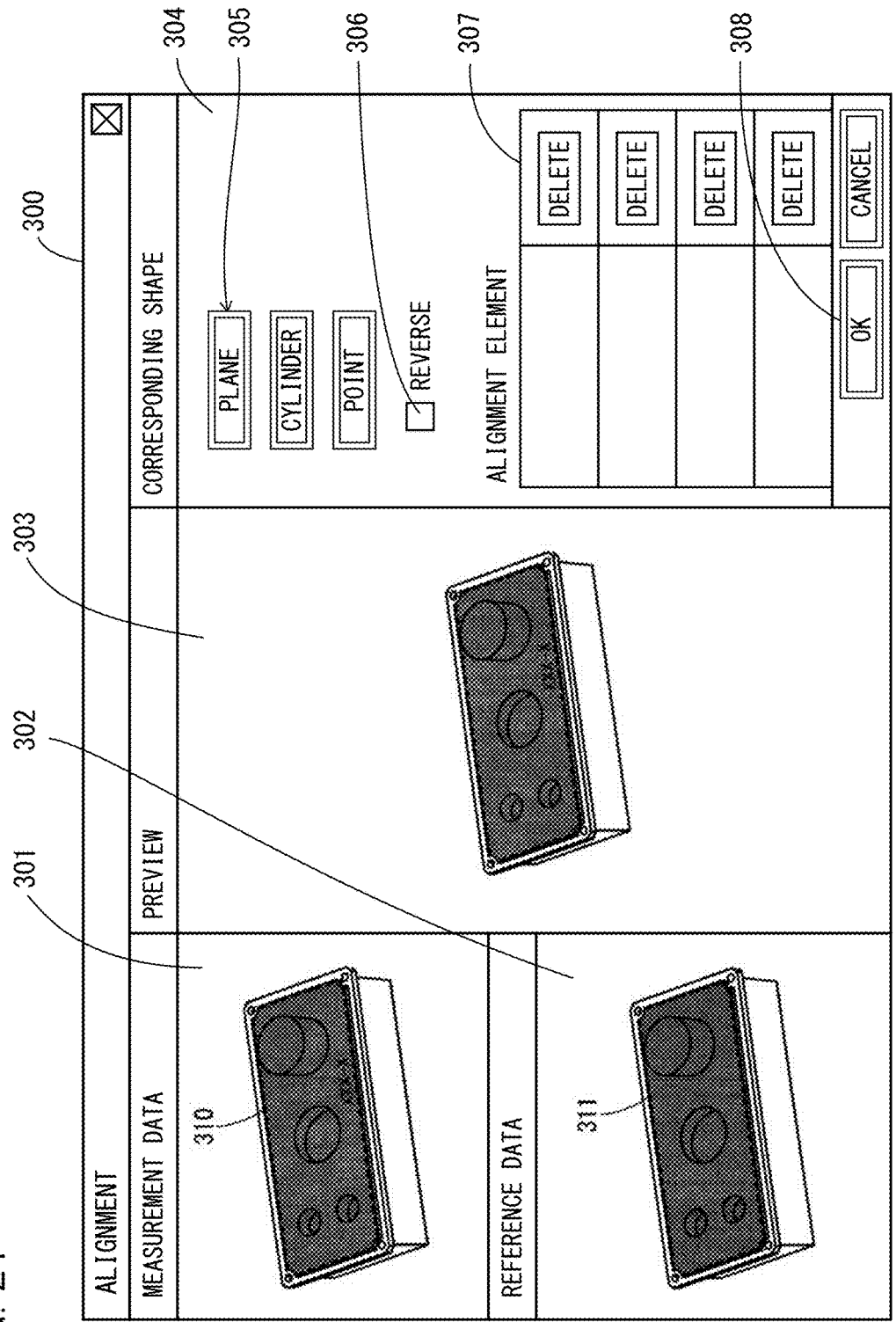
FIG. 21 is a diagram showing an example of operation at the time of alignment at the information processing terminal in FIG. 17, and shows a state after completion of alignment based on a first set of geometric elements.

FIG. 21 shows a state after completion of alignment by a first set of geometric elements 310 and 311. By sequentially extracting the first geometric element 310 and the second geometric element 311 from the measurement three-dimensional shape and the reference three-dimensional shape and operating the OK button 308, these geometric elements are associated with each other as a first set of geometric elements, and alignment is performed. The measurement three-dimensional shape and the reference three-dimensional shape after alignment are displayed in the preview section 303 in an overlapping manner.

In the case of alignment of planes, there remains degrees of freedom regarding movement in the direction parallel to the planes and rotation around an axis which is perpendicular to the planes. Accordingly, alignment may be repeated by designating a second set of geometric elements, or even further, designating a third set of geometric elements so as to increase the accuracy of alignment.

In the case where the first set of geometric elements have planar shapes, alignment by the second set of geometric elements is limited to two degrees of freedom of movement in the direction parallel to the planes of the first set and rotation around an axis which is perpendicular to the planes. That is, alignment by the second set of geometric elements is performed under the limitation of alignment by the first set of geometric elements. Specifically, alignment by the second set of geometric elements is performed under a limitation that the normal lines of the planes of the first set are coincident with each other. In the case where the second set of geometric elements also have planar shapes, alignment by the third set of geometric elements is performed under the limitations of the first set of geometric elements and the second set of geometric elements. Specifically, alignment by the third set of geometric elements is performed under limitations that the normal lines of the planes of the first set are coincident with each other and that the normal lines of the planes of the second set are coincident with each other.

Additionally, if sufficient accuracy is achieved by the alignment by the first set of geometric elements, the second and the third sets of geometric elements do not have to be designated. In the case where the first set of geometric elements have planar shapes, normal lines of the planes are used as the geometric feature, but because the extracted geometric elements are planar shaped with finite ends, sufficient accuracy is sometimes achieved by alignment using a plurality of geometric features of the first set of geometric elements by performing alignment using the position and the shape of an edge in addition to the normal lines of the planes. If sufficient accuracy cannot be achieved by alignment using a plurality of geometric features of the first set of geometric elements, alignment by the second set of geometric elements may be performed, and in this case, the normal lines of the planes of the first set are made the geometric features that limit alignment by the second set of geometric elements, but features of the first set other than the normal lines of the planes are not used for the alignment by the second set of geometric elements, or are made geometric features with less weight regarding limitation. Furthermore, if a fourth set of geometric elements are designated, best fit alignment may be performed. Best fit alignment is a process of using a deviation between pieces of three-dimensional shape data corresponding to the designated geometric elements and shifting the three-dimensional shapes by a very small amount to determine the optimal solution, instead of directly performing alignment by using the geometric features of the geometric elements. The first set of geometric elements may be designated for the best fit alignment. Additionally, in the case where the geometric elements are cylinders or cones, a central axis may be used as the geometric feature.

Furthermore, in the case of alignment by planes, the geometric elements are sometimes aligned in a manner reversed by 180 degrees. In such a case, the direction of a geometric element may be reversed or inverted by inputting a check mark in the reverse box 306.

<Measurement Screen 320>

Figure 22:
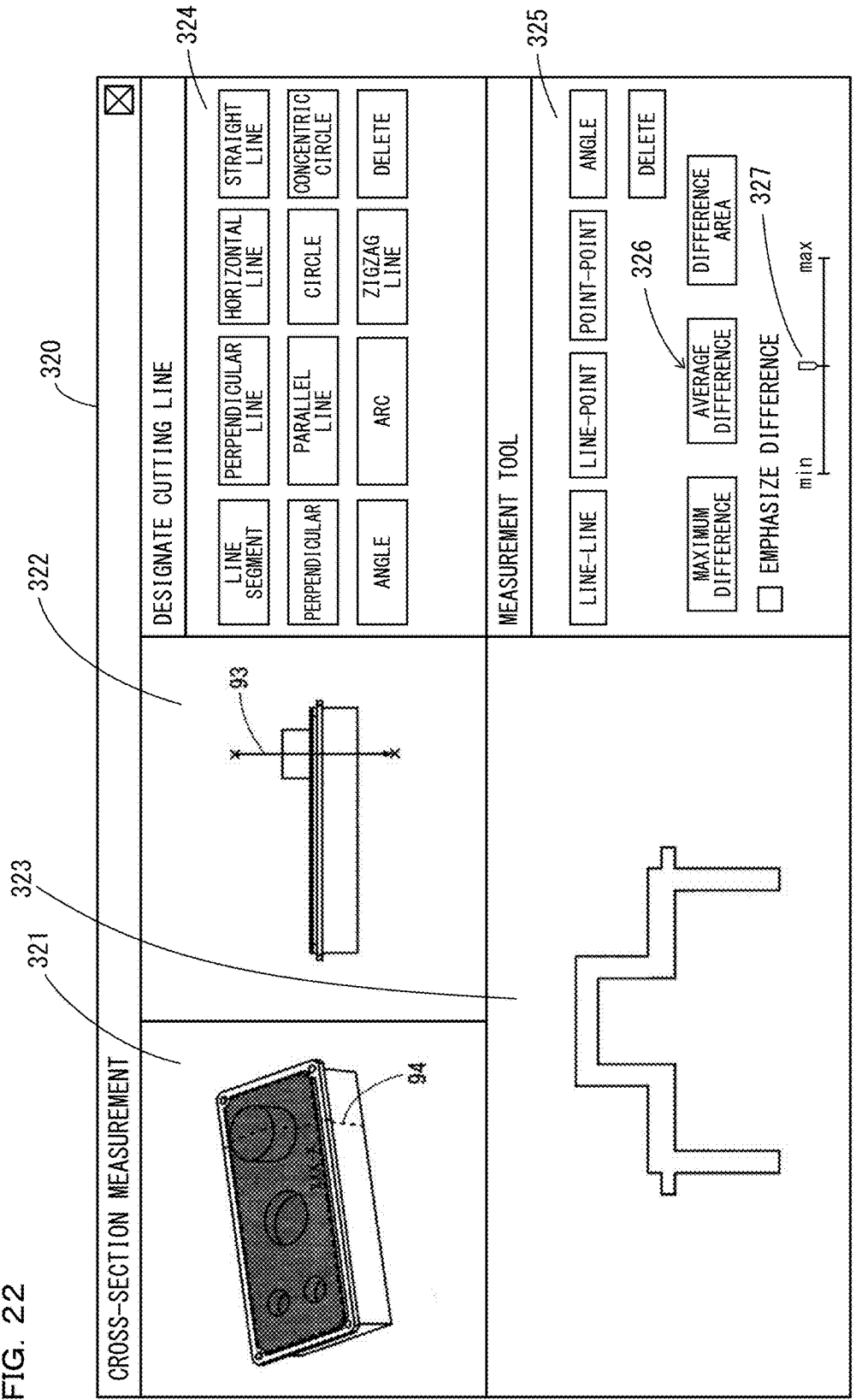
FIG. 22 is a diagram showing an example of operation at the time of cross-section comparison at the information processing terminal in FIG. 17, and shows a measurement screen displayed by the display unit.

FIGS. 22 to 26 are diagrams showing an example of operation at the time of cross-section comparison at the information processing terminal 500 in FIG. 17. FIG. 22 shows a measurement screen 320 which is displayed by the display unit 51. The measurement screen 320 is an operation screen for comparing two cross-sectional profiles, and is displayed by the display unit 51 after completion of alignment of a measurement three-dimensional shape and a reference three-dimensional shape.

The measurement screen 320 includes a three-dimensional shape display section 321, a projection image display section 322, a cross-sectional profile display section 323, and operation sections 324 and 325. A measurement three-dimensional shape and a reference three-dimensional shape after alignment are displayed in the display section 321 in an overlapping manner. A projection image obtained by projecting the measurement three-dimensional shape and the reference three-dimensional shape on the measurement screen 320 is displayed in the display section 322.

The projection image in the display section 322 is created from the measurement three-dimensional shape and the reference three-dimensional shape which have been rotated in such a way that the reference plane is positioned at a specific attitude with respect to the measurement screen 320. For example, the first set of geometric elements for alignment are designated as the reference plane, and a projection image corresponding to the measurement three-dimensional shape and the reference three-dimensional shape which have been rotated in such a way that the normal line of the reference plane is parallel to the vertical direction of the measurement screen 320 is displayed.

Various tool buttons for designating the cutting line 93, and a delete button for deleting the cutting line 93 are arranged in the operation section 324. A measurement cross-sectional profile and a reference cross-sectional profile showing the shapes of cut surfaces when the measurement three-dimensional shape and the reference three-dimensional shape are cut along the cutting line 93 are displayed in the display section 323 in an overlapping manner. Various tool buttons for designating a dimension type, a delete button for deleting a dimension value or a dimension line, various difference buttons 326, and a difference emphasis section 327 are arranged in the operation section 325.

Dimension types that can be selected by the tool buttons include line-line, line-point, point-point, and angle. Also, the difference buttons 326 include a maximum difference, an average difference, and a difference area. The difference button 326 for a difference area is an operation icon for determining the area of a region between the measurement cross-sectional profile and the reference cross-sectional profile.

The difference emphasis section 327 is an input section for displaying a graph that is changed according to the difference value, by superimposing the graph on the cross-sectional profile. When a check mark is input in the check box, a graph is displayed in association with the measurement cross-sectional profile and the reference cross-sectional profile in the focused region, and the degree of shift may be emphasized. Also, the magnification of the difference value may be adjusted by moving the slider.

Figure 23:
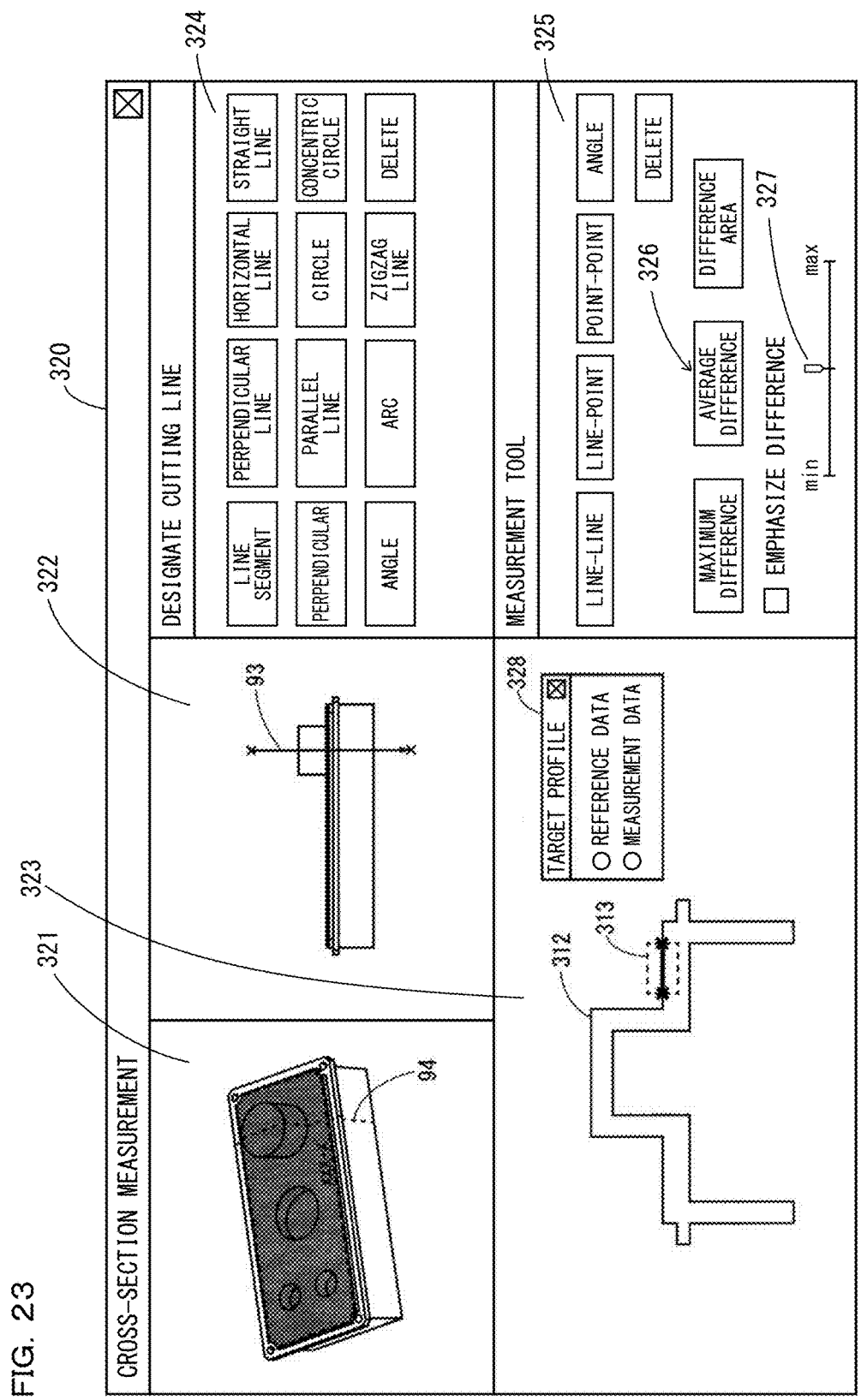
FIG. 23 is a diagram showing an example of operation at the time of cross-section comparison at the information processing terminal in FIG. 17, and shows a profile selection screen displayed on the measurement screen.

FIG. 23 shows a profile selection screen 328 which is displayed on the measurement screen 320. In the case of designating a rectangular region 313 and extracting a straight line from a cross-sectional profile 312, whether the extraction source cross-sectional profile 312 is a cross-sectional profile acquired from measurement data (measurement three-dimensional shape data) or a reference cross-sectional profile acquired from reference data (reference three-dimensional shape data) has to be selected. The profile selection screen 328 is displayed in such a case, and selection of the measurement cross-sectional profile or the reference cross-sectional profile is enabled.

By extracting a straight line from the measurement cross-sectional profile or the reference cross-sectional profile, the distance between two straight lines, the distance between a point and a straight line, an angle formed by two straight lines, or the like may be measured. Also, if a point on the measurement cross-sectional profile or the reference cross-sectional profile is designated, the distance between two points or the like may be measured.

Figure 24:
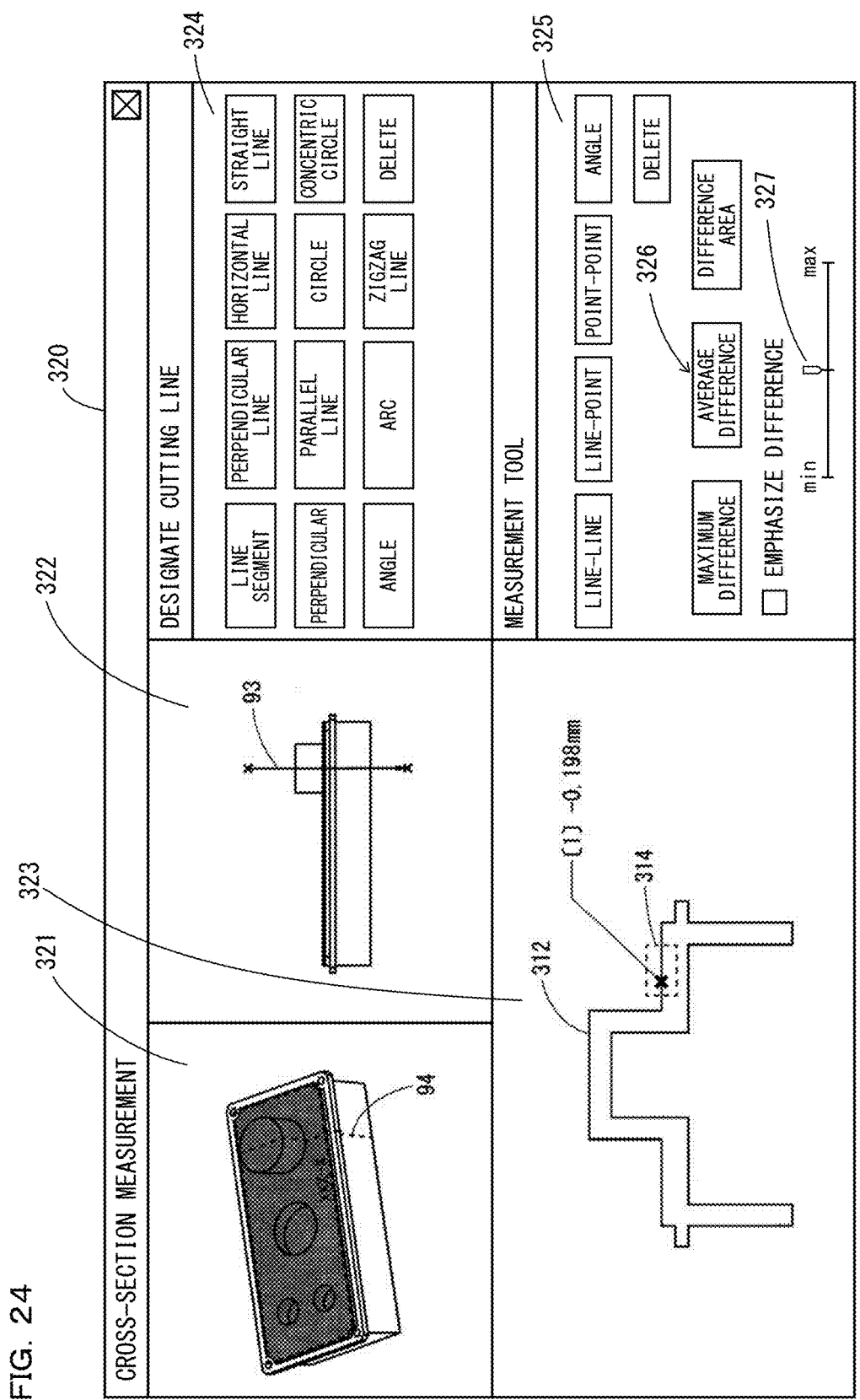
FIG. 24 is a diagram showing an example of operation at the time of cross-section comparison at the information processing terminal in FIG. 17, and shows a case where a focused region is designated for a profile.

FIG. 24 shows a case where a focused region 314 is designated for the cross-sectional profile 312. By designating a focused region 314 for the cross-sectional profile 312, the maximum difference value, the average difference value or a difference area may be determined for the measurement cross-sectional profile and the reference cross-sectional profile in the focused region 314, and be superimposed and displayed as the measurement result.

For example, a maximum difference value "−0.198 mm" is displayed in association with the measurement position. According to such a configuration, the degree or the position of shift between the three-dimensional shapes, or the polarity of shift may be more objectively grasped.

Figure 25:
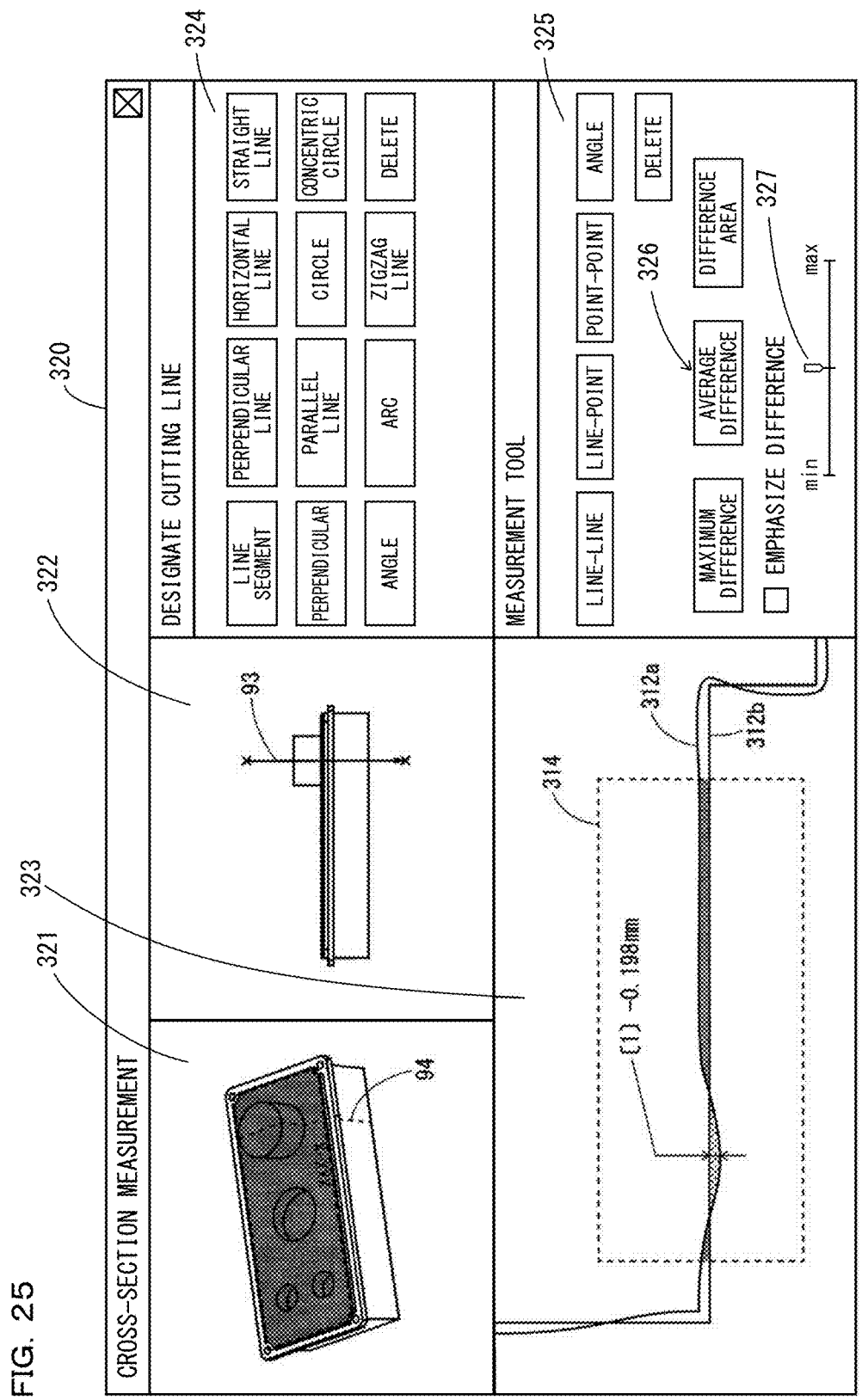
FIG. 25 is a diagram showing an example of operation at the time of cross-section comparison at the information processing terminal in FIG. 17, and shows a case where the display magnification of the profile is increased.

FIG. 25 shows a case where the display magnification of the cross-sectional profile 312 is increased. The display magnification of a measurement cross-sectional profile 312a and a reference cross-sectional profile 312b displayed in the display section 323 may be appropriately changed by mouse operation or the like.

A region between the measurement cross-sectional profile 312a and the reference cross-sectional profile 312b is colored according to the polarity of the difference value. For example, a region where the measurement cross-sectional profile 312a is higher than the reference cross-sectional profile 312b in the normal direction of the reference cross-sectional profile 312b is displayed in red, and a region where the measurement cross-sectional profile 312a is below the reference cross-sectional profile 312b is displayed in blue. According to such a configuration, the visibility regarding the polarity of shift between the three-dimensional shapes may be enhanced.

Figure 26:
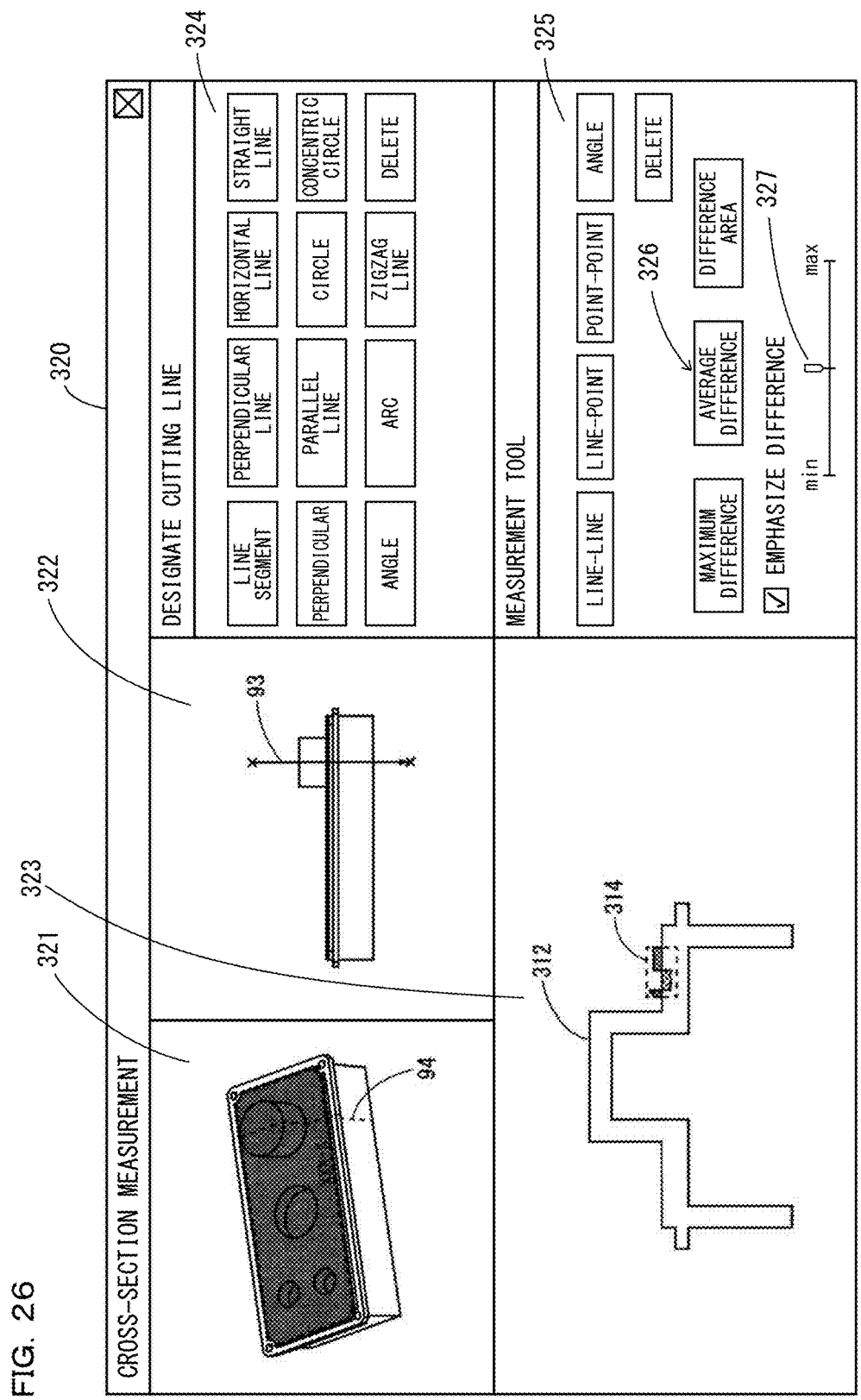
FIG. 26 is a diagram showing an example of operation at the time of cross-section comparison at the information processing terminal in FIG. 17, and shows a case where a graph that changes according to a difference value is displayed.

FIG. 26 shows a case where a graph that is changed according to a difference value is displayed. Displaying a graph that is changed according to a difference value on the cross-sectional profile 312 in the focused region 314 allows the degree of shift to be easily identified. The graph is created by increasing the shift in the normal direction of the reference cross-sectional profile, for example. According to such a configuration, the shift in the focused region 314 is emphasized by the graph, and the degree of shift may be prevented from being indistinguishable depending on the display magnification of the cross-sectional profile 312.

<Report Screen 330>

Figure 27:
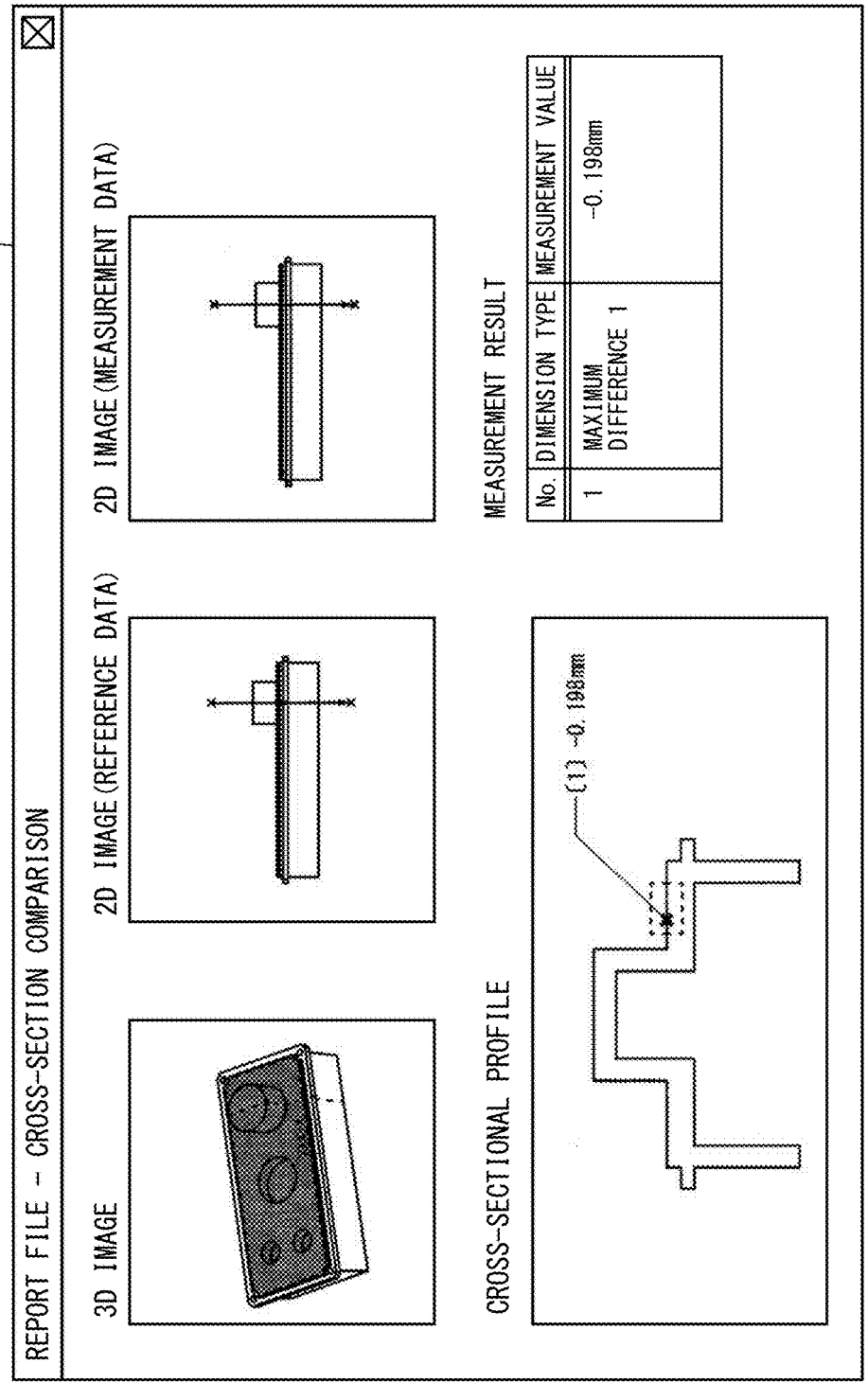
FIG. 27 is a diagram showing an example of operation at the time of report file output at the information processing terminal in FIG. 17.

FIG. 27 is a diagram showing an example of operation at the time of report file output at the information processing terminal 500 in FIG. 17, and shows a report screen 330 which is displayed by the display unit 51. The report screen 330 is an edit screen for recording, or printing, a result of cross-section measurement as a report file, and includes a 3D image display section, a 2D image (reference data) display section, a 2D image (measurement data) display section, a cross-sectional profile display section, and a measurement result display section.

A measurement three-dimensional shape and a reference three-dimensional shape are displayed in the 3D image display section in an overlapping manner. A projection image obtained by projecting the reference three-dimensional shape on the measurement screen 320 is displayed in the 2D image (reference data) display section, and a projection image obtained by projecting the measurement three-dimensional shape on the measurement screen 320 is displayed in the 2D image (measurement data) display section. The shapes of cut surfaces when the measurement three-dimensional shape and the reference three-dimensional shape are cut along the cutting line 93 are displayed as cross-sectional profiles in the cross-sectional profile display section. Results of dimension measurement for the cross-sectional profiles are displayed as a list in the measurement result display section.

Figure 28:
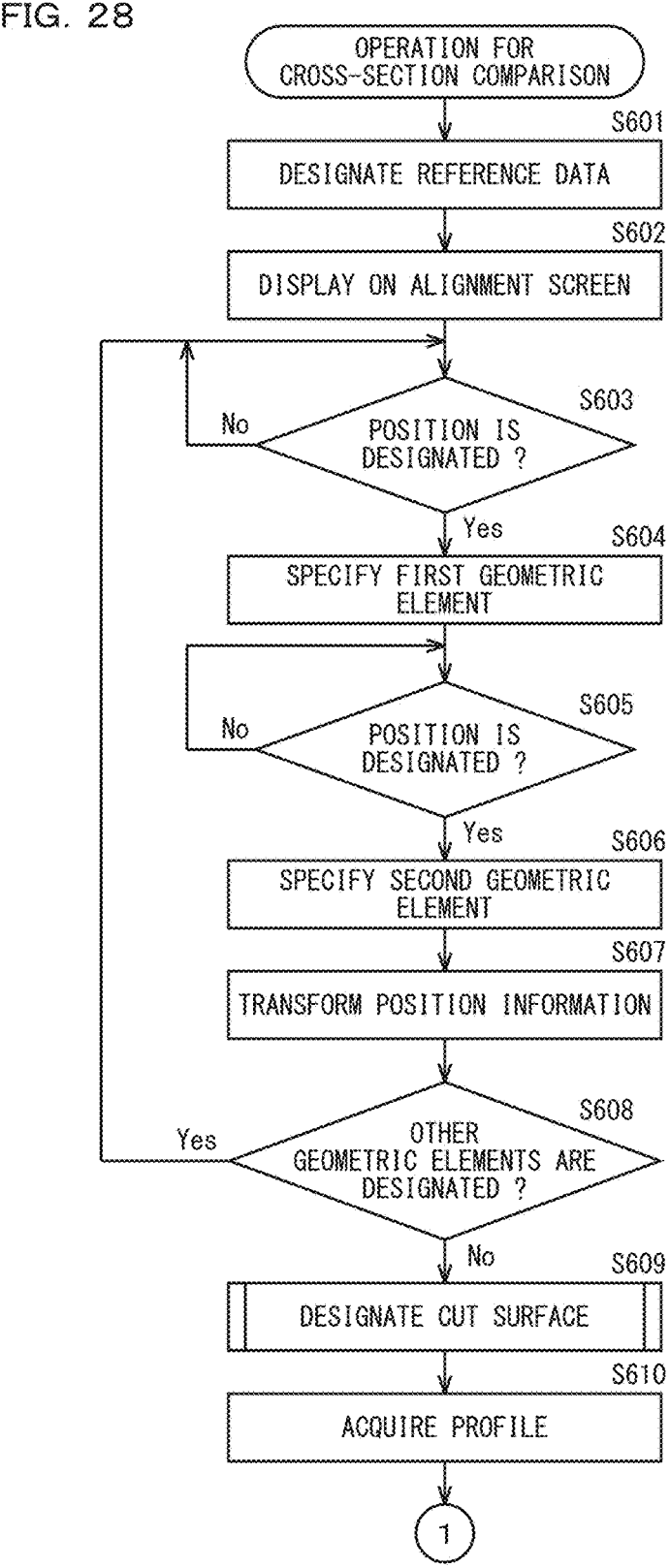
FIG. 28 is a flowchart showing an example of operation at the time of cross-section comparison at the information processing terminal in FIG. 17.
Figure 29:
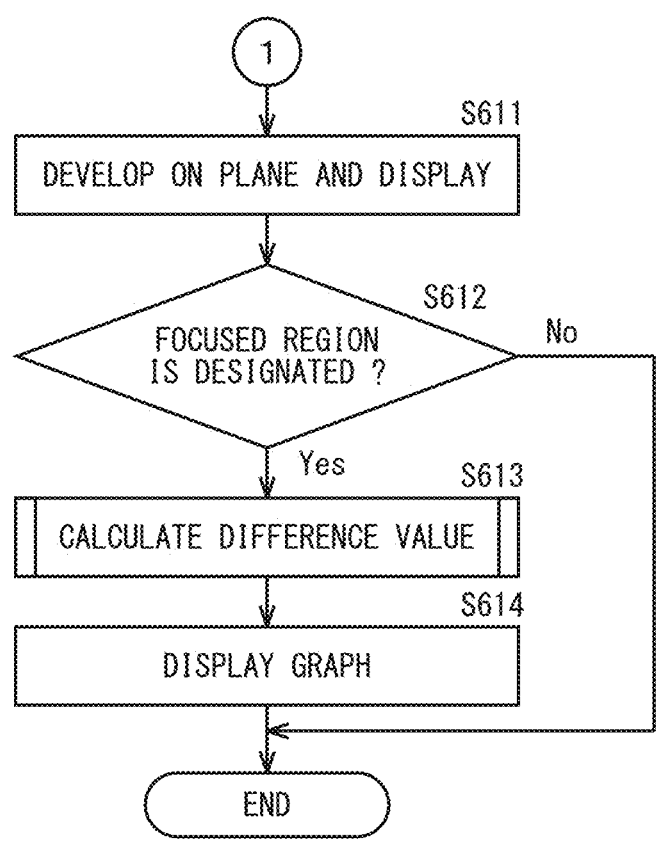
FIG. 29 is a flowchart showing an example of operation at the time of cross-section comparison at the information processing terminal in FIG. 17.

FIGS. 28 and 29 are flowcharts showing, in steps S601 to S614, an example of operation at the time of cross-section comparison at the information processing terminal 500 in FIG. 17. First, the information processing terminal 5 designates reference three-dimensional shape data which is to be used as a reference at the time of comparing shapes (step S601), and displays the data on the alignment screen 300 together with measurement data (measurement three-dimensional shape data) (step S602).

Next, when a position is designated from a measurement three-dimensional shape image being displayed (step S603), the information processing terminal 5 specifies a first geometric element (step S604). Next, when a position is designated from a reference three-dimensional shape image being displayed (step S605), the information processing terminal 5 specifies a second geometric element (step S606).

The information processing terminal 5 associates the specified first geometric element and second geometric element as geometric elements for alignment, and changes the relative position of the measurement three-dimensional shape data and the reference three-dimensional shape data in such a way that these geometric elements coincide with each other (step S607). In the case where other geometric elements are to be designated and alignment is to be repeated, the procedure from steps S603 to S607 is repeated (step S608).

Next, the information processing terminal 5 performs a process of designating a cut surface (step S609). This process is performed in the same manner as the procedure from steps S501 to S507 in FIG. 16, and a plane that includes the cutting line 93 and that is perpendicular to the measurement screen 320 is designated.

Then, the information processing terminal 5 cuts the measurement three-dimensional shape and the reference three-dimensional shape along the cut surface and acquires a measurement cross-sectional profile and a reference cross-sectional profile (step S610), and develops the same on the plane to be displayed on the measurement screen 320 (step S611).

If there is designation of a focused region (step S612), the information processing terminal 5 calculates a difference value for the measurement cross-sectional profile and the reference cross-sectional profile in the focused region (step S613), and displays the value by superimposing a graph (step S614).

According to the present embodiment, by designating positions on a measurement three-dimensional shape image and a reference three-dimensional shape image being displayed, a first geometric element and a second geometric element are each specified and the relative position is changed, and thus, the measurement three-dimensional shape and the reference three-dimensional shape may be made coincident to each other with respect to the position and the attitude. Accordingly, even in the case of three-dimensional shapes which are at different positions or attitudes just after display, cross-sectional shapes may be acquired by performing cutting in the same manner. Also, the measurement three-dimensional shape and the reference three-dimensional shape are shown as the measurement cross-sectional profile and the reference cross-sectional profile, respectively, by two-dimensional geometric figures, and the degree or the position of shift between the three-dimensional shapes may be objectively grasped.

Third Embodiment

In a present embodiment, a case will be described where an information processing terminal has a template function of automatically performing dimension measurement on a three-dimensional shape based on a template.

Figure 30:
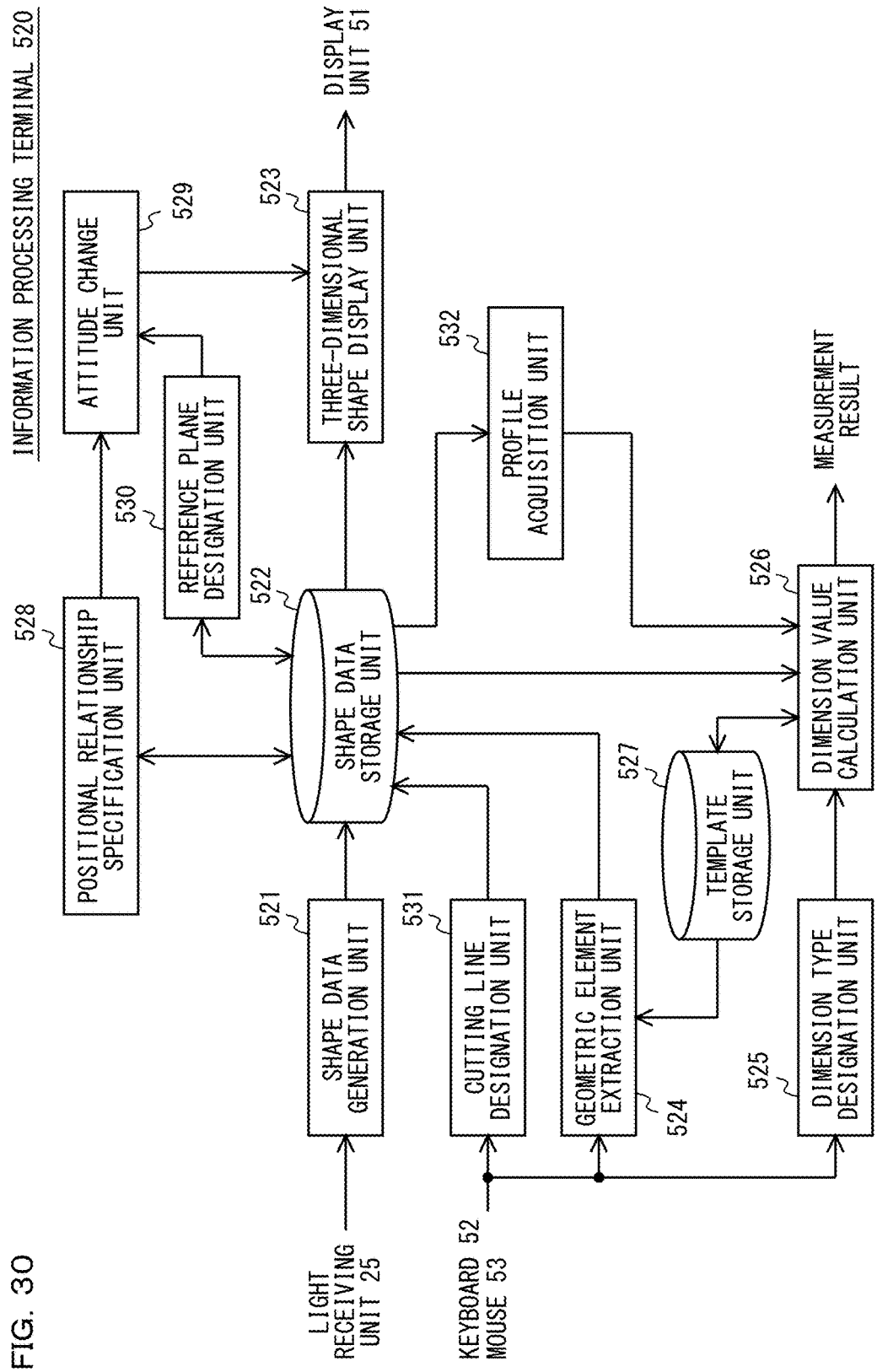
FIG. 30 is a block diagram showing an example configuration of a three-dimensional measurement device according to a third embodiment of the present invention, and shows an information processing terminal having a template function.

FIG. 30 is a block diagram showing an example configuration of a three-dimensional measurement device 1 according to the third embodiment of the present invention, and shows an information processing terminal 520 having the template function. The information processing terminal 520 is configured from a shape data generation unit 521, a shape data storage unit 522, a three-dimensional shape display unit 523, a geometric element extraction unit 524, a dimension type designation unit 525, a dimension value calculation unit 526, a template storage unit 527, a positional relationship specification unit 528, an attitude change unit 529, a reference plane designation unit 530, a cutting line designation unit 531, and a profile acquisition unit 532.

The shape data generation unit 521 measures the three-dimensional shape of a measurement target object W and generates measurement three-dimensional shape data, and stores the data in the shape data storage unit 522. The shape data storage unit 522 holds model three-dimensional shape data which is used as a model at the time of repeatedly performing dimension measurement on a plurality of measurement target objects W having substantially the same shape. As the model three-dimensional shape data, CAD data which is created by CAD may be used, for example. Additionally, the model three-dimensional shape data may be three-dimensional shape data acquired by measuring a master piece, or three-dimensional shape data which was measured in the past.

The three-dimensional shape display unit 523 reads the model three-dimensional shape data and the measurement three-dimensional shape data from the shape data storage unit 522, controls the display unit 51, and displays a model three-dimensional shape image and a measurement three-dimensional shape image on an alignment screen. The model three-dimensional shape image is created based on the model three-dimensional shape data, and the measurement three-dimensional shape image is created based on the measurement three-dimensional shape data.

The geometric element extraction unit 524 specifies a first geometric element based on designation of a position from the model three-dimensional shape image being displayed. Designation of a position is performed based on a user operation by the keyboard 52 or the mouse 53. Moreover, the geometric element extraction unit 524 specifies a second geometric element based on designation of a position from the measurement three-dimensional shape being displayed.

The dimension type designation unit 525 receives designation of a dimension type. The dimension value calculation unit 526 performs dimension measurement on the model three-dimensional shape image being displayed, determines a dimension value, and outputs the value as a measurement result.

The template storage unit 527 stores, as a template, the model three-dimensional shape data and an operation procedure of dimension measurement performed on the model three-dimensional shape image. The operation procedure includes information about how and where the model three-dimensional shape is measured, and, for example, a measurement position, the shape of a geometric element, and the dimension type are held as a set in the order of operation.

When measurement three-dimensional shape data which is a target of template application is acquired, the positional relationship specification unit 528 specifies the relative positional relationship between the model three-dimensional shape data and the measurement three-dimensional shape data. The relative positional relationship is specified based on the first geometric element and the second geometric element. That is, the relative positional relationship is specified as a condition for the first geometric element on the model three-dimensional shape and the second geometric element on the measurement three-dimensional shape to overlap with each other in a space and to coincide with each other with respect to the position and the attitude.

The geometric element extraction unit 524 specifies the geometric element on the measurement three-dimensional shape based on the relative positional relationship specified by the positional relationship specification unit 528 and the template in the template storage unit 527. The dimension value calculation unit 526 performs dimension measurement on the measurement three-dimensional shape based on the relative positional relationship specified by the positional relationship specification unit 528 and the template in the template storage unit 527.

The attitude change unit 529 relatively changes the display attitudes of the model three-dimensional shape and the measurement three-dimensional shape, based on the relative positional relationship specified by the positional relationship specification unit 528, in such a way that the first geometric element and the second geometric element are coincident with each other. For example, the display attitude of one of the model three-dimensional shape and the measurement three-dimensional shape is changed. Alternatively, the display attitudes of both the model three-dimensional shape and the measurement three-dimensional shape may be changed. The three-dimensional shape display unit 523 displays the model three-dimensional shape and the measurement three-dimensional shape after change of display attitude in an overlapping manner. The dimension value calculation unit 526 starts dimension measurement of the measurement three-dimensional shape based on the template in response to an instruction for measurement start.

The reference plane designation unit 530 designates, as the reference plane, from the model three-dimensional shape, a plane which is to be used as a reference at the time of cutting the three-dimensional shape. To cause the reference plane to be normally faced, the attitude change unit 529 rotates the model three-dimensional shape in such a way that the normal line of the reference plane is orthogonal to the measurement screen. In addition, to cause the reference plane to be oriented in the vertical direction or the lateral direction, the attitude change unit 529 rotates the model three-dimensional shape in such a way that the normal line of the reference plane is parallel to the vertical direction or the lateral direction of the measurement screen.

The cutting line designation unit 531 receives designation of a cutting line in the measurement screen. The profile acquisition unit 532 acquires a model cross-sectional profile showing the cross-sectional shape of the model three-dimensional shape that is cut along a cut surface that includes the cutting line and that is perpendicular to the measurement screen, based on the model three-dimensional shape data. The profile acquisition unit 532 acquires a model cross-sectional profile by cutting, along the cut surface, the model three-dimensional shape after rotation. The dimension value calculation unit 526 performs dimension measurement based on such a model cross-sectional profile.

If a geometric element is designated after dimension measurement of the measurement three-dimensional shape based on the template, the dimension value calculation unit 526 performs dimension measurement on the corresponding measurement position of the measurement three-dimensional shape, and determines the dimension value.

<Alignment Screen 400>

Figure 31:
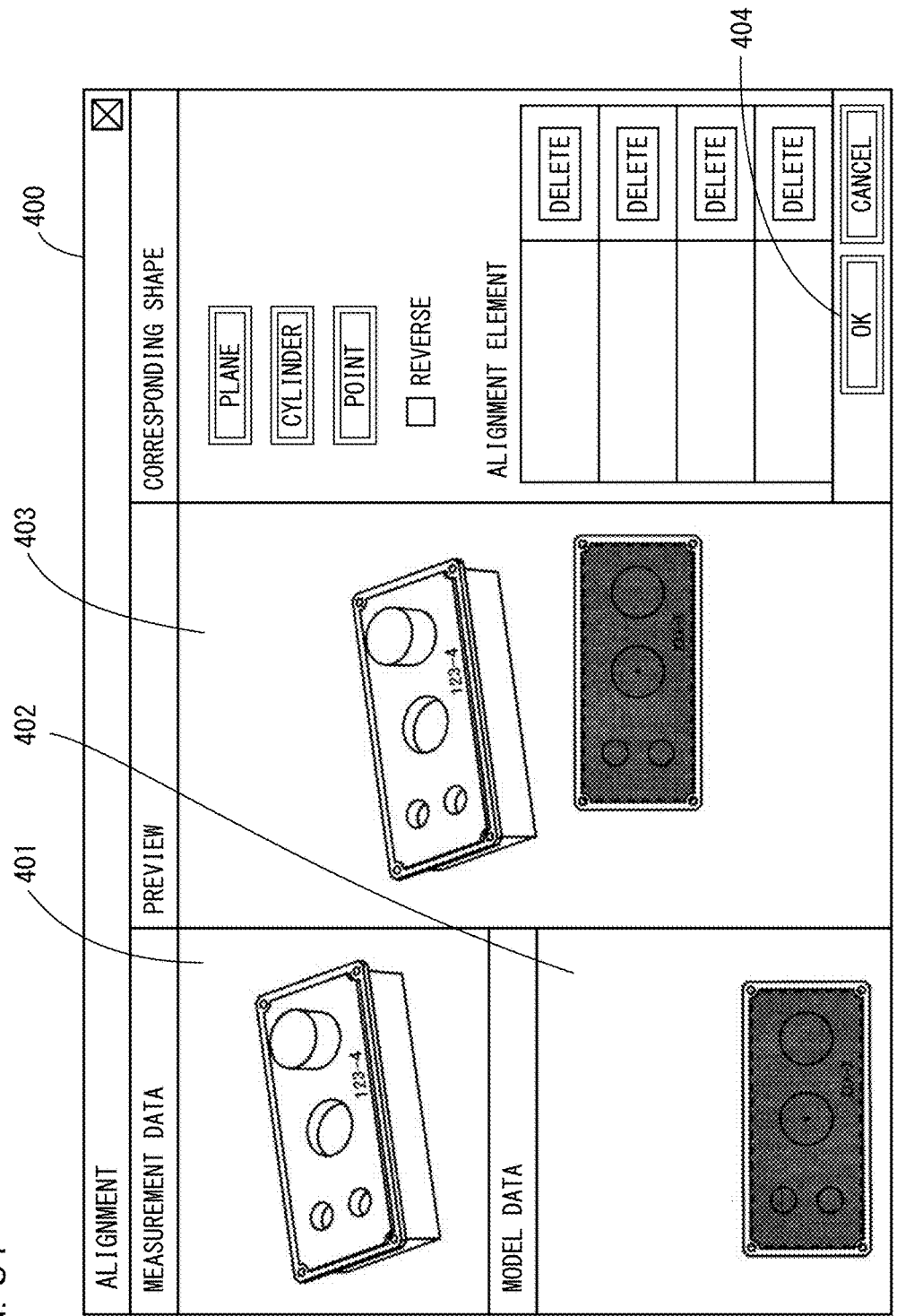
FIG. 31 is a diagram showing an example of operation at the time of alignment at the information processing terminal in FIG. 30, and shows an alignment screen which is displayed by a display unit.

FIG. 31 is a diagram showing an example of operation at the time of alignment at the information processing terminal 520 in FIG. 30, and shows an alignment screen 400 which is displayed by the display unit 51. The alignment screen 400 is an operation screen for performing alignment between measurement data (measurement three-dimensional shape data) and model data (model three-dimensional shape data).

The alignment screen 400 includes a display section 401 for displaying measurement data, a display section 402 for displaying model data, a preview section 403 for displaying the measurement data and the model data in a common coordinate system, and the like.

Alignment of the measurement data and the model data is performed by designating a position on a measurement three-dimensional shape and extracting a second geometric element, designating a position on a model three-dimensional shape and extracting a first geometric element, and then operating an OK button 404. When there is an instruction for start of measurement after completion of alignment based on the geometric elements, dimension measurement based on a template is started.

<Measurement Screen 410>

Figure 32:
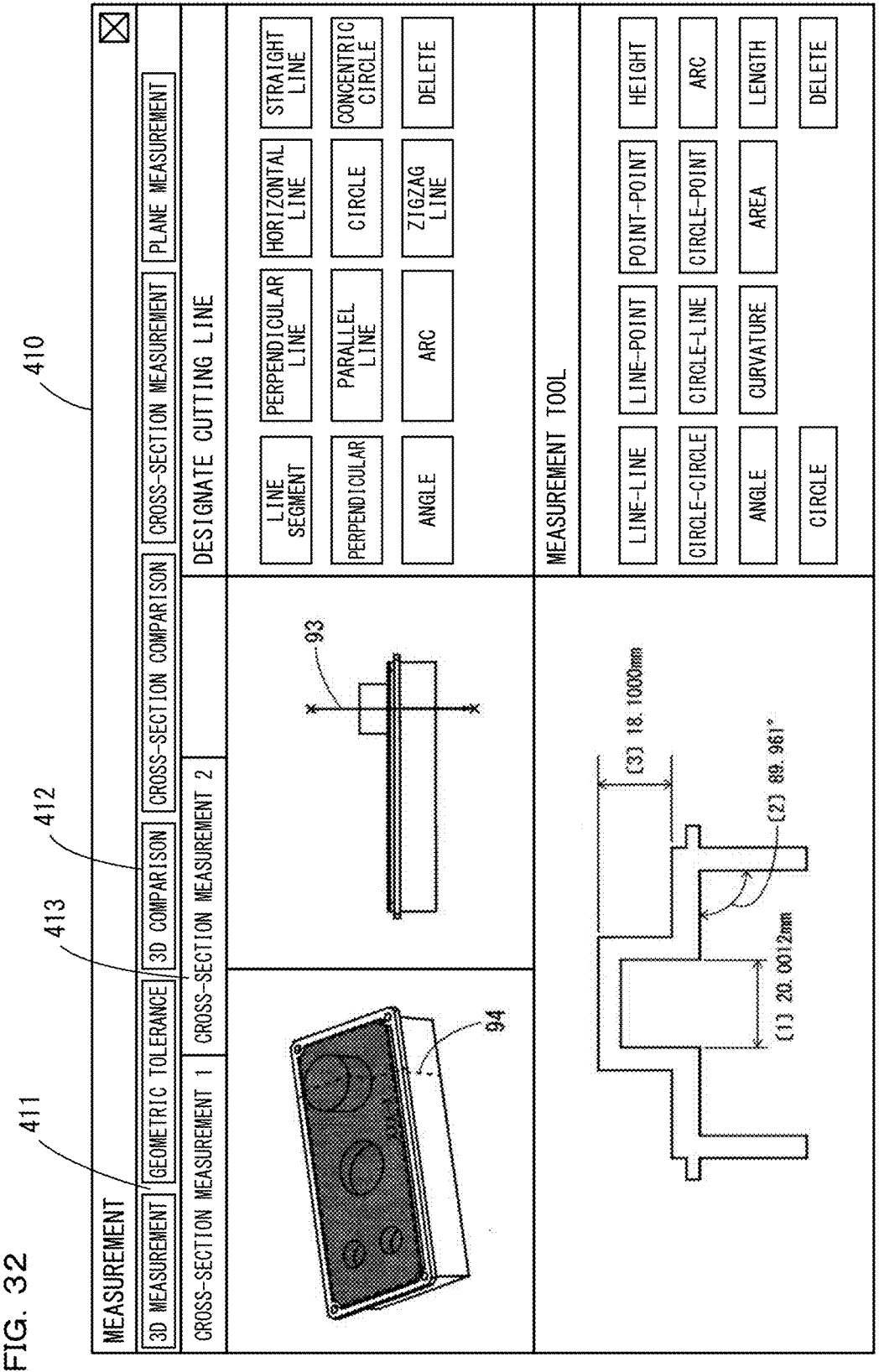
FIG. 32 is a diagram showing an example of operation at the time of application of a template at the information processing terminal in FIG. 30, and shows a measurement screen displayed by the display unit.

FIG. 32 is a diagram showing an example of operation at the time of application of a template at the information processing terminal 520 in FIG. 30, and shows a measurement screen 410 which is displayed by the display unit 51. The measurement screen 410 is an operation screen which is displayed after dimension measurement based on a template, and in a menu section 411, type buttons 412 for designating measurement types are provided, and tabs 413 according to selected measurement types are arranged.

The measurement types include 3D measurement, geometric tolerance, 3D comparison, cross-section comparison, cross-section measurement, and plane measurement. In 3D measurement, geometric elements are specified for a three-dimensional shape, and a distance or an angle between the geometric elements is measured. In cross-section comparison, a measurement cross-sectional profile and a reference cross-sectional profile are acquired from a measurement three-dimensional shape and a reference three-dimensional shape, respectively, and the cross-sectional profiles are compared against each other. In cross-section measurement, a cross-sectional profile is acquired from a three-dimensional shape, and dimension measurement is performed.

Measurement of a same type is managed by the tab 413, and when the tabs 413 are switched, measurement contents are also switched. Moreover, even in the case of measurement of a same type, if the type button 412 is newly operated, a tab 413 is newly created. Other configurations are the same as those of the measurement screen 9 shown in FIG. 13.

Figure 33:
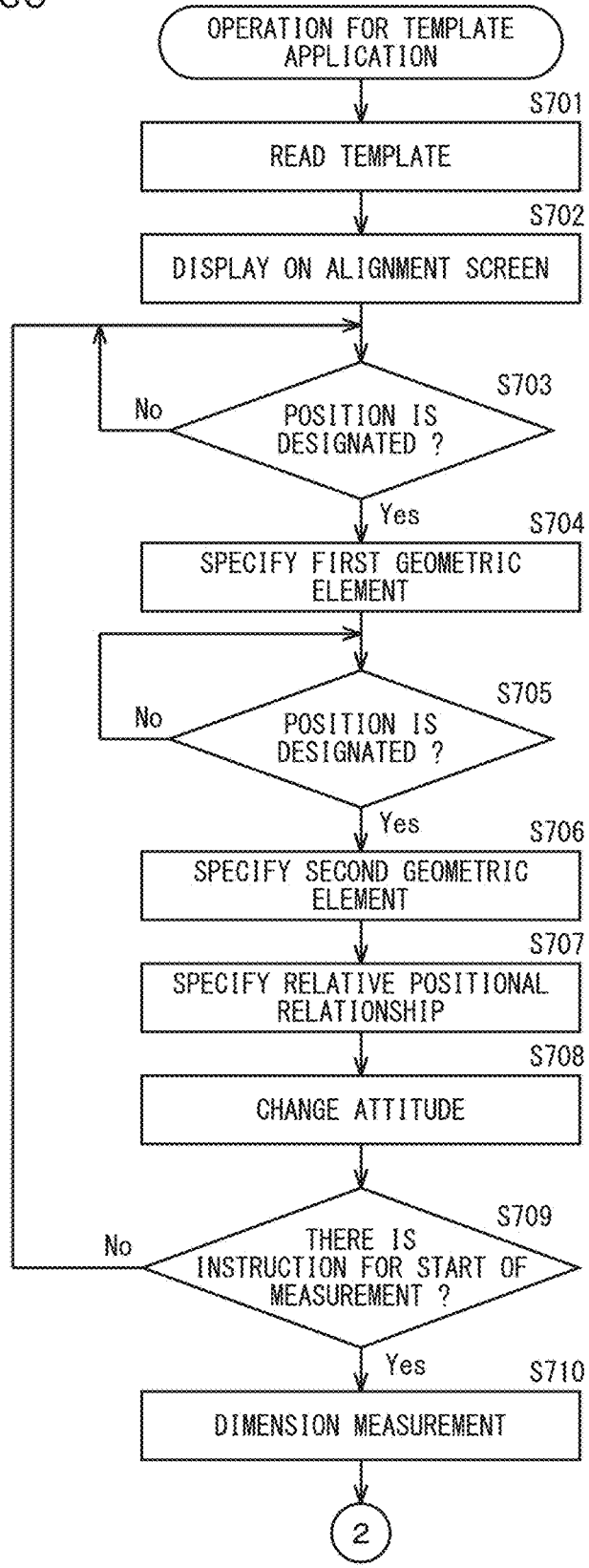
FIG. 33 is a flowchart showing an example of operation at the time of application of a template at the information processing terminal in FIG. 30.
Figure 34:
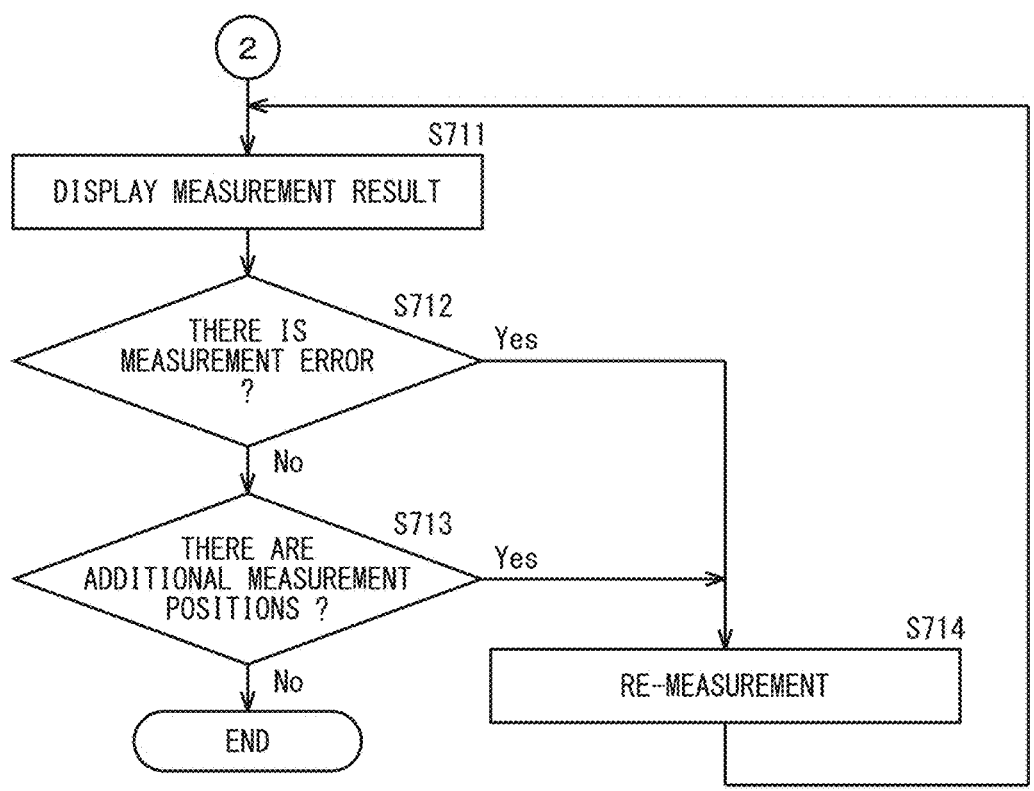
FIG. 34 is a flowchart showing an example of operation at the time of application of a template at the information processing terminal in FIG. 30.

FIGS. 33 and 34 are flowcharts showing, in steps S701 to S714, an example of operation at the time of application of a template at the information processing terminal 520 in FIG. 30. First, the information processing terminal 520 reads a template (step S701), and displays the templated on the alignment screen 400 together with measurement data (measurement three-dimensional shape data) (step S702).

Next, when a position is designated from the model three-dimensional shape being displayed (step S703), the information processing terminal 520 specifies a first geometric element (step S704). Next, when a position is designated from the measurement three-dimensional shape being displayed (step S705), the information processing terminal 5 specifies a second geometric element (step S706).

The information processing terminal 520 specifies a relative positional relationship between the model three-dimensional shape and the measurement three-dimensional shape based on the first geometric element and the second geometric element which have been specified (step S707). Next, the information processing terminal 5 relatively changes the display attitudes of the model three-dimensional shape and the measurement three-dimensional shape in such a way that the first geometric element and the second geometric element are coincident with each other (step S708). Additionally, in the case of making the installation position of a measurement target object W perfectly coincident each time by using a jig or the like, the process of relative alignment may be skipped.

The information processing terminal 520 repeats the procedure from steps S703 to S708 until an instruction for start of measurement is issued (step S709). Next, when there is an instruction for start of measurement, the information processing terminal 520 performs dimension measurement based on the template and the relative positional relationship (step S710), and displays the measurement result on the measurement screen 410 (step S711).

Next, if there is a measurement error due to missing data or the like (step S712), the information processing terminal 520 performs measurement on the corresponding position again (step S714), and displays the measurement result on the measurement screen 410 (step S711). If there is an instruction to add a measurement position (step S713), the information processing terminal 520 performs measurement again (step S714), and displays the measurement result on the measurement screen 410 (step S711).

According to the present embodiment, because model three-dimensional shape data and the operation procedure of dimension measurement performed on a model three-dimensional shape image are stored as a template, the burden of having to designate the geometric element at a measurement position or the dimension type for each measurement target object W can be avoided. Since a first geometric element and a second geometric element are specified and the relative positional relationship between model three-dimensional shape data and measurement three-dimensional shape data is specified by designating positions from a model three-dimensional shape image and a measurement three-dimensional shape image being displayed, dimension measurement may be performed by accurately specifying a geometric element at a measurement position from the measurement three-dimensional shape.

Furthermore, since the model three-dimensional shape and the measurement three-dimensional shape are displayed in an overlapping manner, whether alignment by the first geometric element and the second geometric element is appropriate or not may be easily checked. Also, dimension measurement of the measurement three-dimensional shape based on the template is started in response to an instruction for start of measurement, and thus, dimension measurement of the measurement three-dimensional shape based on the template may be prevented from being performed when alignment by the first geometric element and the second geometric element is not appropriate.

Additionally, in the present embodiments, a case where the head unit 20 includes one light receiving unit 25 and two light projection units 24 is described as an example; however, the head unit 20 of the present invention is not limited to such a configuration. For example, the present invention is also applicable to a case where the head unit includes one light receiving unit 25 and one light projection unit 24, or to a case where the head unit includes two light receiving units 25 and one light projection unit 24.

Furthermore, in the present embodiments, a case where the head unit 20 and the stage holding unit 22 are fixedly coupled to each other is described as an example; however, the head unit 20 and the stage holding unit 22 may be separable from each other.

What is claimed is:

1. A three-dimensional measurement device comprising:
   a shape data generation unit configured to measure respective three-dimensional positions of a plurality of measurement points in a three-dimensional space, and to generate a point cloud representing a measurement three-dimensional shape of a measurement target object from the respective three-dimensional positions;
   a display configured to display a measurement three-dimensional shape image of the measurement target object based on the point cloud representing the measurement three-dimensional shape of the measurement target object, and to display a model three-dimensional shape image corresponding to a model three-dimensional shape data representing a model object;
   a dimension calculator configured to receive, as a dimension measurement, a dimension type and a position on the model three-dimensional shape image displayed by the display, and to determine a dimension value of the model object based on the dimension type and a measuring position in accordance with the position on the model three-dimensional shape image;
   a memory configured to store, as a template, the model three-dimensional shape data and an operation procedure of the dimension measurement performed by the dimension calculator;
   a selector configured to receive a position on the model three-dimensional shape image of the model object displayed by the display, to receive a position on the measurement three-dimensional shape image of the measurement target object displayed by the display, and to select, based on the position on the measurement three-dimensional shape image, a subset of the point cloud;
   an extractor configured to determine a first geometric element corresponding to the position on the model three-dimensional shape of the model object received by the selector, and a second geometric element fitting the subset of the point cloud selected by the selector; and
   a positional calculator configured to determine a relative positional relationship between the model three-dimensional shape data and the point cloud representing the measurement three-dimensional shape of the measurement target object based on the first geometric element and the second geometric element,
   wherein the extractor is further configured to determine a geometric element on a measurement three-dimensional shape based on the relative positional relationship and the template, and
   wherein the dimension calculator is further configured to determine, as the dimension measurement, a dimension type and a measuring position of the measurement target object based on the relative positional relationship and the template, and determine a dimension value of the measurement target object based on the dimension type and the measuring position of the measurement target object.

2. The three-dimensional measurement device according to claim 1,
   wherein the display is further configured to display, based on the relative positional relationship, the model three-dimensional shape image and the measurement three-dimensional shape image in an overlapping manner in such a way that the first geometric element and the second geometric element are coincident with each other, and
   wherein the dimension calculator is further configured to start the dimension measurement of the measurement three-dimensional shape based on the template in response to an instruction for start of measurement.

3. The three-dimensional measurement device according to claim 2, further comprising:
   a reference plane designator configured to designate a reference plane from the model three-dimensional shape image;
   a cutting line designator configured to receive a cutting line in a display screen of the display; and
   a profile acquisition unit configured to acquire, based on the model three-dimensional shape data, a model cross-sectional profile showing a cross-sectional shape of a model three-dimensional shape that is cut along a cut surface that includes the cutting line and that is perpendicular to the display screen, wherein the display is further configured to rotate the model three-dimensional shape in such a way that a normal line of the reference plane is orthogonal to the display screen or is parallel to a vertical direction or a lateral direction of the display screen, wherein the profile acquisition unit is further configured to acquire the model cross-sectional profile by cutting, along the cut surface, the model three-dimensional shape after rotation, and wherein the dimension calculator is further configured to perform the dimension measurement of the measurement three-dimensional shape based on the model cross-sectional profile.

4. The three-dimensional measurement device according to claim 1, wherein, if a geometric element is designated after the dimension measurement of the measurement three-dimensional shape based on the template, the dimension calculator performs the dimension measurement of the measurement three-dimensional shape for a corresponding measurement position, and determines a dimension value.

5. The three-dimensional measurement device according to claim 3, wherein the profile acquisition unit is further configured to acquire, based on the measurement three-dimensional shape data, a measurement cross-sectional profile showing a cross-sectional shape of a measurement three-dimensional shape that is cut along a cut surface that includes the cutting line and that is perpendicular to the display screen, wherein the display is further configured to rotate the measurement three-dimensional shape in such a way that a normal line of the reference plane is orthogonal to the display screen or is parallel to a vertical direction or a lateral direction of the display screen, wherein the profile acquisition unit is further configured to acquire the measurement cross-sectional profile by cutting, along the cut surface, the measurement three-dimensional shape after rotation, and wherein the dimension calculator is further configured to perform the dimension measurement of the measurement three-dimensional shape based on the measurement cross-sectional profile and the model cross-sectional profile.

6. The three-dimensional measurement device according to claim 5, further comprising a focused region designation unit configured to designate a focused region with respect to the measurement cross-sectional profile and the model cross-sectional profile, wherein the dimension calculator is further configured to perform the dimension measurement of the measurement three-dimensional shape based on the measurement cross-sectional profile and the model cross-sectional profile in the focused region.

7. The three-dimensional measurement device according to claim 5, further comprising a focused region designation unit configured to designate a focused region with respect to the measurement cross-sectional profile and the model cross-sectional profile; and a profile display unit configured to display the measurement cross-sectional profile and the model cross-sectional profile, and to emphasize a difference between the measurement cross-sectional profile and the model cross-sectional profile in the focused region.

* * * * *